US012761971B2

(12) United States Patent
Hu et al.

(10) Patent No.: US 12,761,971 B2
(45) Date of Patent: Oct. 13, 2026

(54) SYSTEM, METHOD, AND MEDIUM FOR ELASTIC ALLOCATION OF RESOURCES FOR DEEP LEARNING JOBS

(71) Applicant: Huawei Cloud Computing Technologies Co., Ltd., Gui'an New District (CN)

(72) Inventors: Liang Hu, Coquitlam (CA); Jiangcheng Zhu, Hangzhou (CN); Zirui Zhou, Richmond (CA); Ruiqing Cheng, Hangzhou (CN); Yong Zhang, Richmond (CA)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 481 days.

(21) Appl. No.: 18/518,375

(22) Filed: Nov. 22, 2023

(65) Prior Publication Data

US 2024/0086249 A1 Mar. 14, 2024

Related U.S. Application Data

(63) Continuation of application No. PCT/CN2021/096924, filed on May 28, 2021.

(51) Int. Cl.
*G06F 9/50* (2006.01)
*G06N 20/00* (2019.01)

(52) U.S. Cl.
CPC ........... *G06F 9/5055* (2013.01); *G06N 20/00* (2019.01)

(58) Field of Classification Search
CPC ................. G06F 9/5055; G06F 9/5027; G06F 2209/5019; G06N 20/00; G06N 3/084; G06N 3/09
See application file for complete search history.

(56) References Cited

U.S. PATENT DOCUMENTS 11,537,439 B1 * 12/2022 Liberty ................. G06F 9/5077
2010/0131959 A1 * 5/2010 Spiers ....................... G06F 9/50 718/105

(Continued)

FOREIGN PATENT DOCUMENTS

CN 112000473 A 11/2020
WO 2020042721 A1 3/2020

OTHER PUBLICATIONS

W. Zhang et al., "GaDei: On Scale-Up Training as a Service for Deep Learning," 2017 IEEE International Conference on Data Mining (ICDM), New Orleans, La, USA, 2017, pp. 1195-1200, doi: 10.1109/ICDM.2017.161. (Year: 2017).*

(Continued)

*Primary Examiner* — Jorge A Chu Joy-Davila

(57) ABSTRACT

Systems, methods, and processor-readable media for elastic allocation of resources for deep learning jobs are described. A machine-learning-as-a-service (MLaaS) of a cloud computing system includes an elastic training module which includes resource allocator for allocating resources to training jobs that optimizes overall estimated time to completion (ETC) for all training jobs received by the system and uses node-based resource allocation. The elastic training module may realize a combination of high resource utilization, short training times, and low queueing delay relative to existing approaches, thereby potentially enabling the realization of higher profits for a cloud computing system which provides MLaaS to users (i.e. customers). An improved user interface is described, enabling users to specify a range of resources to elastically allocate to the user's training job, and/or informing users of training time saved through the use of elastic resource allocation.

20 Claims, 11 Drawing Sheets

(56) References Cited

U.S. PATENT DOCUMENTS

| | | | | |
|---|---|---|---|---|
| 2019/0227853 | A1* | 7/2019 | Huang | G06F 9/5038 |
| 2020/0412663 | A1* | 12/2020 | Bryc | H04L 67/60 |
| 2021/0034374 | A1 | 2/2021 | Saxena | |
| 2021/0192279 | A1* | 6/2021 | Laaksonen | G16H 30/40 |
| 2021/0256387 | A1* | 8/2021 | Chopra | G06N 3/0464 |
| 2022/0035672 | A1* | 2/2022 | Vinod | G06F 9/5077 |

OTHER PUBLICATIONS

Overview of Auto Scaling. Alibaba Cloud. URL: https://www.alibabacloud.com/help/zh/doc-detail/176660.htm?spm=a2c63.p38356.a1.2.5ec3642d8RvzNI.

Lin, H., Zhang, H., Ma, Y., He, T., Zhang, Z., Zha, S. and Li, M., 2019. Dynamic mini-batch SGD for elastic distributed training: learning in the limbo of resources. arXiv preprint arXiv:1904.12043 2019.

Saxena, V., Jayaram, K.R., Basu, S., Sabharwal, Y. and Verma, A., Nov. 2020. Effective elastic scaling of deep learning workloads. In 2020 28th International Symposium on Modeling, Analysis, and Simulation of Computer and Telecommunication Systems (MASCOTS) (pp. 1-8). IEEE 2020.

* cited by examiner

SYSTEM, METHOD, AND MEDIUM FOR ELASTIC ALLOCATION OF RESOURCES FOR DEEP LEARNING JOBS

RELATED APPLICATIONS

This application is a continuation of International Patent Application No. PCT/CN2021/096924, filed May 28, 2021, entitled "SYSTEM, METHOD, AND MEDIUM FOR ELASTIC ALLOCATION OF RESOURCES FOR DEEP LEARNING JOBS", the contents of which are incorporated herein by reference in its entirety.

FIELD

The present disclosure relates to resource allocation for machine learning jobs, and in particular to systems, methods, and processor-readable media for elastic allocation of resources for deep learning jobs.

BACKGROUND

Cloud computing is a form of network-based computing (e.g., Internet-based computing) that enables access to shared pools of configurable computing resources and higher-level services that can be rapidly provisioned with minimal management effort, often over the Internet. Cloud computing is another paradigm shift that follows the shift from mainframe based computing to client-server based computing that is implemented as services. Cloud computing service providers generally deliver three main types of services (referred to hereinafter as cloud computing services), infrastructure as a service (IaaS), platform as a service (PaaS), and software as a service (SaaS), by creating virtual machines on demand for use by customers. IaaS provides a computing infrastructure that can be rented and used by customers. The computing infrastructure comprises physical computing resources (e.g., processors, memory, storage, servers, networking components, etc.) that are virtualized and shared among customers. PaaS provides a platform that allows customers to develop, run, and manage software applications without having to build and maintain the computing infrastructure. SaaS provides software applications running on the computing infrastructure on demand over the Internet on a subscription basis.

In recent years, cloud computing systems have included a type of PaaS, generally referred to as Machine-Learning-as-a-Service (MLaaS), for delivering machine learning functionality as a service to software developers (e.g. customers of the MLaaS). Machine Learning (ML) is an artificial intelligence technique in which algorithms are used to build a model from sample data that is capable of being applied to input data to perform a specific inference task (i.e., making predictions or decisions based on new data) without being explicitly programmed to perform the specific inference task. Deep learning is one of the most successful and widely deployed machine learning algorithms. Deep learning typically uses artificial neural networks consisting of layers of non-linear parametric functions or "neurons". To train the neural network using supervised or semi-supervised learning, data samples are received by an input layer of the network and are processed by the neurons of the network to generate outputs, such as inference data, at an output layer of the network. This is called forward propagation. The outputs of the network are compared to ground-truth information associated with the data samples, such as semantic labels indicating a ground truth that can be compared to the outputs generated by the network. Training the neural network involves optimizing values of the learnable parameters of the neurons, typically using gradient-based optimization algorithms, to minimize a loss function. This process is called backpropagation. A particular configuration or architecture of an artificial neural network (also called simply a neural network or NN) used for deep learning is commonly referred to as a neural network model, a machine learning model, a deep learning model, or simply a model.

Deep learning is typically very computationally intensive. In particular, training a deep learning model requires large amounts of computing resources, such as processing power and memory accesses. Accordingly, a MLaaS of a cloud computing system provides an efficient approach to training deep learning models, because the MLaaS has access to highly efficient and powerful computing resources of the cloud computing system which can be used to train a deep learning model in a relatively short period of time even when the software developer does not have full-time access to a powerful computing system. Accordingly, many MLaaS services are offered to software developers, providing a standardized hardware and software platform that may be used for training deep learning models.

However, existing MLaaSs tend to be limited in their ability to efficiently provide services to multiple users (otherwise referred to as customers, such as software developers using a training service for training their deep learning models), due to shortcomings in how computing resources of the cloud computing platform are allocated among training jobs and how training jobs are scheduled. A MLaaS of a cloud computing system may include a training system for training machine learning models which is offered as a service to users (i.e. customers of the MLaaS). The training system receives requests from users in the form of deep learning job profiles (also called simply "job profiles" herein) which include training information defining a training job (also called simply a "job" herein), e.g. a set of operations that must be performed to train a specific deep learning model using a specific training dataset and a machine learning algorithm. When a user submits a job profile, the training information submitted by the user typically must specify, among other things (such as the model, the training dataset, and the number of training epochs or other training completion criteria), the desired computing resources to be used for the training job defined by the job profile, such as the number of nodes required for performing the training job. A node is most commonly a cluster of 8 graphical processing units (GPUs), but may be some other number of GPUs (e.g., 2, 4, or 16) and/or other processor devices such as central processing units (CPUs), tensor processing units (TPUs), neural processing units (NPUs), or other hardware artificial intelligence (AI) accelerators. The training system will typically use the user-specified fixed number of nodes, or a predetermined fixed number of nodes, to perform the training job. There are at least two problems with using a fixed number of nodes for performing the training job.

First, the training system uses a fixed number of nodes (also called a "node count") for any given training job may use the computing resources allocated to the training service inefficiently. If the training system is performing a small number of training jobs at a given time, the system will leave many of the computation resources allocated to the training service idle. In other words, the training jobs could have each utilized more nodes in order to complete sooner, instead of wasting the computing capacity of the idle nodes. For example, a training system which has been allocated 100 nodes of the cloud computing system but is performing only a single training job, wherein the fixed number of nodes assigned to the training job is 8 nodes, is wasting 92 of the nodes allocated to the system.

Second, the computing resources used by a system are always limited by the size of the resource pool, e.g. the number of nodes available for allocation to training jobs. It is common for a system to receive multiple job profiles from users while a small number of computationally-intensive training jobs are monopolizing the resource pool, requiring the training service to maintain the later job profiles in a job queue for a significant period of time while waiting for the computationally-intensive training jobs to complete. This introduces significant delays, even for small training jobs that could be completed quickly if any nodes were available. These delays are arguably inefficient in terms of meeting the needs of the user of the training services, and tends to generate dissatisfaction by users of the training service who experience such delays.

Accordingly, training systems have been developed that perform elastic training of deep learning models (referred to herein as "elastic training systems") to address the limitations of existing training services which use a fixed number of nodes for a given training job. An elastic training system dynamically allocates computing resources (e.g., nodes) to training jobs based on the status of the system (e.g., how many nodes are in use, how many jobs are in the job queue) and job attributes (e.g., how computationally intensive is a given training job) to address the two problems described above. If the system has abundant computation resources available (e.g., a large number of idle nodes), an elastic training system may scale up one or more ongoing training jobs, i.e., allocate more nodes or other computing resources to the one or more ongoing training jobs. If an elastic training system is busy (e.g., all nodes are being used for ongoing training jobs), the elastic training system scales down one or more of the ongoing jobs, i.e., releases some nodes or other computing resources so that new training jobs can use the released nodes or other computing resources instead of waiting in the job queue.

The core of an elastic training system is its resource allocator. A resource allocator should optimally decide on the nodes or other computing resources assigned to each training job so that the elastic training system can (1) improve efficient utilization of computing resources, (2) speed up the overall training time required to complete a given set of training jobs, (3) reduce queueing delay, and (4) improve the user experience when submitting a job profile to the system. By achieving one or more of these objectives, and providing the benefits thereof to users, an elastic training system may also be able to realize higher profits in providing a paid deep learning PaaS to users, through a combination of higher revenue from users due to improved service, and/or lower overhead costs due to more efficient use of resources.

Resource allocators used by existing elastic training systems include greedy resource allocators and GPU-level resource allocators. These will be briefly described, along with some of their limitations.

An example greedy resource allocator is described by Chinese Patent No. 87068967CN02A, entitled "Design and Implementation Method for Elastic Distributed Training Systems". A greedy resource allocator is typically a rule-based allocator that tries to utilize as many nodes in the system as possible. The greedy resource allocator allocates the resource pool of the elastic training system based on four different scenarios, in which every training job is allocated a node count within a range, such as 1 to 16 nodes.

In the first scenario, the elastic training system has at least one idle node and at least one training job in the job queue. The greedy allocator allocates as many nodes as possible to the training job at the front of the job queue. If there are still idle nodes and training jobs in the job queue, this procedure is repeated until all nodes are occupied or all training jobs have exited the job queue and are being performed.

In the second scenario, the elastic training system has at least one idle node and no training jobs in the job queue. The greedy resource allocator finds the training job with the shortest training time, and then scales up this training job by increasing its node count as large as possible. If there are still idle nodes, this procedure is repeated until all nodes have been occupied or all training jobs have scaled up.

In the third scenario, the elastic training system has no idle nodes and at least one training job in the job queue. Thus, the computation resources of the system have reached their limit. Some training jobs might be occupying all the nodes while many others have to wait in the job queue. The greedy resource allocator finds the training job with the longest training time, scales down the training job through reducing its node count by half, and then allocates the released nodes to the training job at the front of the job queue.

In the fourth scenario, the elastic training system has no idle nodes and no training jobs in the job queue. This is the simplest scenario. All nodes are occupied and no training jobs are waiting. In this case, the elastic training system changes nothing about the current node allocation.

The resource allocator is called a "greedy resource allocator" because it always tries to utilize the system's computing resources to their fullest extent, i.e. leave no nodes idle. The rules governing the greedy resource allocator's behavior tends to be simple and fast to compute, i.e. little or no delay is introduced in computing how to apply the rules. However, the simplicity of the behavior of the greedy resource allocation results in several limitations.

First, while the greedy resource allocator keeps as many nodes working as possible, the allocation of nodes to training jobs may not be efficient or fair. For example, a greedy resource allocator may inefficiently allocate 99 nodes to job 1 and 1 node to job 2, instead of allocating 50 nodes to each job (job 1 and job 2). Although both allocations utilize all 100 nodes, the second one is obviously more equal and may result in more overall efficiency.

Second, training time may not be a good metric to use in deciding which job should scale up or down. The greedy resource allocator scales up the job with the shortest training time, but if this job has a very small workload, one node may be sufficient; the additional nodes might be more effectively deployed to a larger training job. Similarly, the greedy resource allocator scales down the job with the longest training time, but this may result in computationally intensive training jobs having their node count reduced repeatedly, thereby resulting in unnecessarily long training times.

Third, the decisions of the greedy resource allocator are short-sighted. The greedy resource allocator only deals with what is currently happening in the elastic training system, but has no consideration for the future. Because the system will face different computing demands in the future, it is necessary to look ahead and plan computing resource allocation accordingly.

An example of the second type of elastic resource allocator, a GPU-level resource allocator, is described by Saxena, V., Jayaram, K. R., Basu, S., Sabharwal, Y. and Verma, A., 2020, November. "Effective elastic scaling of deep learning workloads". In 2020 28th International Symposium on Modeling, Analysis, and Simulation of Computer and Telecommunication Systems (MASCOTS) (pp. 1-8). IEEE. The example GPU-level resource allocator attempts to find the best combination of batch size (i.e. the number of training data samples to obtain from a training dataset to use to train the model) and number of GPUs for each training job. First, each training job's runtime is estimated by splitting the job into multiple iterations, each iteration using a single batch of training data samples from the training dataset, and summing the estimated runtime for each iteration in the training job. The runtime for a given iteration is estimated based on a given number of GPUs and a given batch size. Second, the training job's processing rate is estimated. The processing rate is the number of training data samples processed per unit time, using the given number of GPUs and the given batch size. Third, the training job's throughput scaling factor is estimated. The throughput scaling factor is the training job's processing rate divided by a baseline processing rate. The baseline processing rate is the rate when a training job is trained with maximum batch size using a single GPU. Finally, the total throughput scaling factor of all training jobs is maximized using a dynamic programming method, yielding an optimal GPU allocation for the training jobs.

The GPU-level resource allocator has a number of limitations. First, the GPU-level resource allocator only works for GPU-level resource allocation, and the logic does not apply to node-level allocation decisions (e.g., allocation of 8-GPU nodes). Second, the GPU-level resource allocator does not ensure that the number of GPUs allocated to each job is a power of 2 (i.e. $2^n$), so there might be precision problems while jobs are training, as parallel computing typically requires that computing operations to be split recursively by powers of two to avoid accuracy problems.

Accordingly, it would be useful to provide an elastic training system that overcomes one or more of the limitations of existing approaches identified above.

SUMMARY

The present disclosure describes systems, methods, and processor-readable media for elastic allocation of resources for deep learning jobs. Example embodiments provide an elastic training system that include a resource allocator that overcomes one or more of the limitations of resource allocation approaches used by existing resource allocators by optimizing overall estimated time to completion (ETC) for all deep learning jobs received by the elastic training system and using a node-based resource allocator to allocate computing resources (e.g. nodes) to a particular deep learning job to meet the ETC for the deep learning job. Example embodiments of the elastic training system of the present disclosure realize a combination of high resource utilization, short training times, and low queueing delay relative to existing approaches, thereby potentially enabling the realization of higher profits from a deep learning PaaS service. Example embodiments of the elastic training system of the present disclosure may also provide an improved user interface enabling users of the elastic training system to specify a range of resources to elastically allocate to the user's training job, and/or informing users of training time saved through the use of elastic resource allocation.

As used herein, the terms "job", "training job", and "deep learning job" are used interchangeably to refer to a set of operations performed to train a deep learning model. These operations may include initializing the model, forward propagating training samples from a training dataset through the model, computing an objective function based on outputs of the model and labels of the training data samples, back propagating the objective function through the model to adjust the learnable parameter values of the model, repeating these training steps for one or more batches of training data within each of one or more training epochs, determining whether the training of the model is complete, validating the training of the model using a validation dataset, and/or other machine learning operations. A given "job" may be referred to herein to mean the operations of the job or a pointer or reference identifying the job; for example, when a job is placed in a job queue, this may refer to storing information indicating that the operations of the job should be performed only after certain conditions are met with respect to a job queue position associated with the job.

According to an example aspect of the present disclosure, there is provided a method for training a plurality of models using a cloud computing resource pool comprising a plurality of nodes. Each node comprises a plurality of processor devices. The method comprises a number of operations. A plurality of job profiles is obtained. Each job profile comprises training information for a training job. A training job comprises training one of the plurality of models. For each job profile, the respective training information is processed to generate one or more node count sequences, each node count sequence indicating, for each of a first plurality of time periods beginning with a first time period and ending with a final time period, a node count for the respective training job, and for each node count sequence, generate a respective estimated progress value of the respective training job at the end of the final time period. The estimated progress values corresponding to each of the one or more node count sequences of each of the plurality of training jobs are processed to generate an estimated optimal allocation sequence comprising a respective selected node count sequence for each training job. For each training job, over the first time period, a number of the plurality of nodes indicated by the node count of the respective selected node count sequence for the first time period are used to train the respective model based on the training information for the respective model.

According to an example aspect of the present disclosure, there is provided a system. The system comprises a cloud computing resource pool comprising a plurality of nodes, a resource allocation processor device, and a memory. The memory stores instructions that, when executed by the resource allocation processor device, cause the resource allocation processing unit to train a plurality of models. A plurality of job profiles is obtained. Each job profile comprises training information for a training job. A training job comprises training one of the plurality of models. For each job profile, the respective training information is processed to generate one or more node count sequences, each node count sequence indicating, for each of a first plurality of time periods beginning with a first time period and ending with a final time period, a node count for the respective training job, and for each node count sequence, generate a respective estimated progress value of the respective training job at the end of the final time period. The estimated progress values corresponding to each of the one or more node count sequences of each of the plurality of training jobs are processed to generate an estimated optimal allocation sequence comprising a respective selected node count sequence for each training job. For each training job, over the first time period, a number of the plurality of nodes indicated by the node count of the respective selected node count sequence for the first time period are used to train the respective model based on the training information for the respective model.

In some example aspects, the method may further include determining a respective maximum value and a respective minimum value of the node count for each training job. Each node count sequence indicates, for each of a first plurality of time periods beginning with a first time period and ending with a final time period, a node count for the respective training job between and inclusive of the maximum value and the minimum value.

In some example aspects, for each job profile, the minimum value, the maximum value, and the training information may be determined based on user input obtained from a user device.

In some example aspects, the method may further include obtaining the training information for a first job profile of the plurality of job profiles based on a first user input obtained from the user device, processing the training information to generate an estimated time to completion (ETC) for the training job of the first job profile, generating user output information indicating the ETC for the training job, sending the user output information to the user device, and obtaining the minimum value and the maximum value of the node count based on a second user input obtained from the user device.

In some example aspects, obtaining the maximum value based on the second user input may include computing the maximum value as the lower of: a node count cap value, and a user input node count maximum value indicated by the second user input.

In some example aspects, obtaining the minimum value and the maximum value based on the second user input may include determining that the training job should use a fixed node count based on the second user input, and setting the maximum value and minimum value to a predetermined fixed node count value.

In some example aspects, the method may further include, after training the models over the first time period, a number of additional operations. An actual progress value is determined for each training job. For each job profile, the respective training information and the respective actual progress value are processed to generate one or more node count sequences. Each node count sequence indicates, for each of a second plurality of time periods beginning with a new first time period and ending with a new final time period, a node count for the respective training job. For each node count sequence, a respective estimated progress value of the respective training job at the end of the new final time period is generated. The estimated progress values corresponding to each of the one or more node count sequences of each of the plurality of training jobs are processed to compute an estimated optimal allocation sequence comprising a respective selected node count sequence for each training job. For each training job, over the new first time period, a number of the plurality of nodes indicated by the node count of the respective selected node count sequence for the new first time period are used to train the respective model using machine learning based on the training information for the respective model.

In some example aspects, processing the estimated progress values to compute the estimated optimal resource allocation may include a number of additional operations. A plurality of allocation sequences are generated, each allocation sequence comprising a node count sequence for each of the plurality of training jobs. For each allocation sequence, an overall estimated progress value is computed based on the estimated progress value of each node count sequence of the allocation sequence. The estimated optimal allocation sequence is selected from the plurality of allocation sequences based on the overall estimated progress value of each allocation sequence.

In some example aspects, the overall estimated progress value of an allocation sequence may be the mean of the estimated progress value of each node count sequence of the allocation sequence.

In some example aspects, for each training job, the estimated progress value may be an estimated proportion of the training job that will be complete at the end of the final time period.

In some example aspects, the method may further include obtaining a further job profile. In response to determining that the number of training jobs of the plurality of job profiles is at least equal to the number of nodes of the cloud computing resource pool, the further job profile is added to a job queue. In response to determining that the number of training jobs of the plurality of job profiles is less than the number of nodes of the cloud computing resource pool and that the further job profile is at a front of the job queue, the following steps are repeated: processing the training data of each job profile, including the further job profile, to generate a respective estimated progress value of each respective training job at the end of a further plurality of time periods; processing the estimated progress values to compute an estimated optimal allocation sequence; and training the models, including the model of the further job profile, over a further time period of the further plurality of time periods.

In some example aspects, the method may further include computing a fixed-allocation estimated time to completion (ETC) for a first training job of the plurality of training jobs premised on the allocation of a fixed number of nodes to the first training job. In response to determining that the first training job has completed, user output information is generated indicating: a total training time for the first training job, and an estimated training time savings based on the total training time and the fixed-allocation ETC for the first training job. The user output information is sent to a user device.

In some example aspects, the user output information may further include training time allocation information indicating changes in the number of nodes allocated to the training job over the total training time.

According to another aspect of the present disclosure, there is provided a non-transitory computer-readable medium storing instructions thereon to be executed by a resource allocation processor device in a cloud computing system. The instructions, when executed, cause the resource allocation processor device to train a plurality of models using a cloud computing resource pool comprising a plurality of nodes. Each node comprises a plurality of processor devices. A plurality of job profiles is obtained. Each job profile comprises training information for a training job. A training job comprises training one of the plurality of models. For each job profile, the respective training information is processed to generate one or more node count sequences, each node count sequence indicating, for each of a first plurality of time periods beginning with a first time period and ending with a final time period, a node count for the respective training job, and for each node count sequence, generate a respective estimated progress value of the respective training job at the end of the final time period. The estimated progress values corresponding to each of the one or more node count sequences of each of the plurality of training jobs are processed to generate an estimated optimal allocation sequence comprising a respective selected node count sequence for each training job. For each training job, over the first time period, a number of the plurality of nodes indicated by the node count of the respective selected node count sequence for the first time period are used to train the respective model based on the training information for the respective model.

BRIEF DESCRIPTION OF THE DRAWINGS

Reference will now be made, by way of example, to the accompanying drawings which show example embodiments of the present application, and in which.

Similar reference numerals may have been used in different FIGS. to denote similar components.

DESCRIPTION OF EXAMPLE EMBODIMENTS

The present disclosure describes examples in the context of cloud computing.

Example Cloud Computing System

Figure 1:
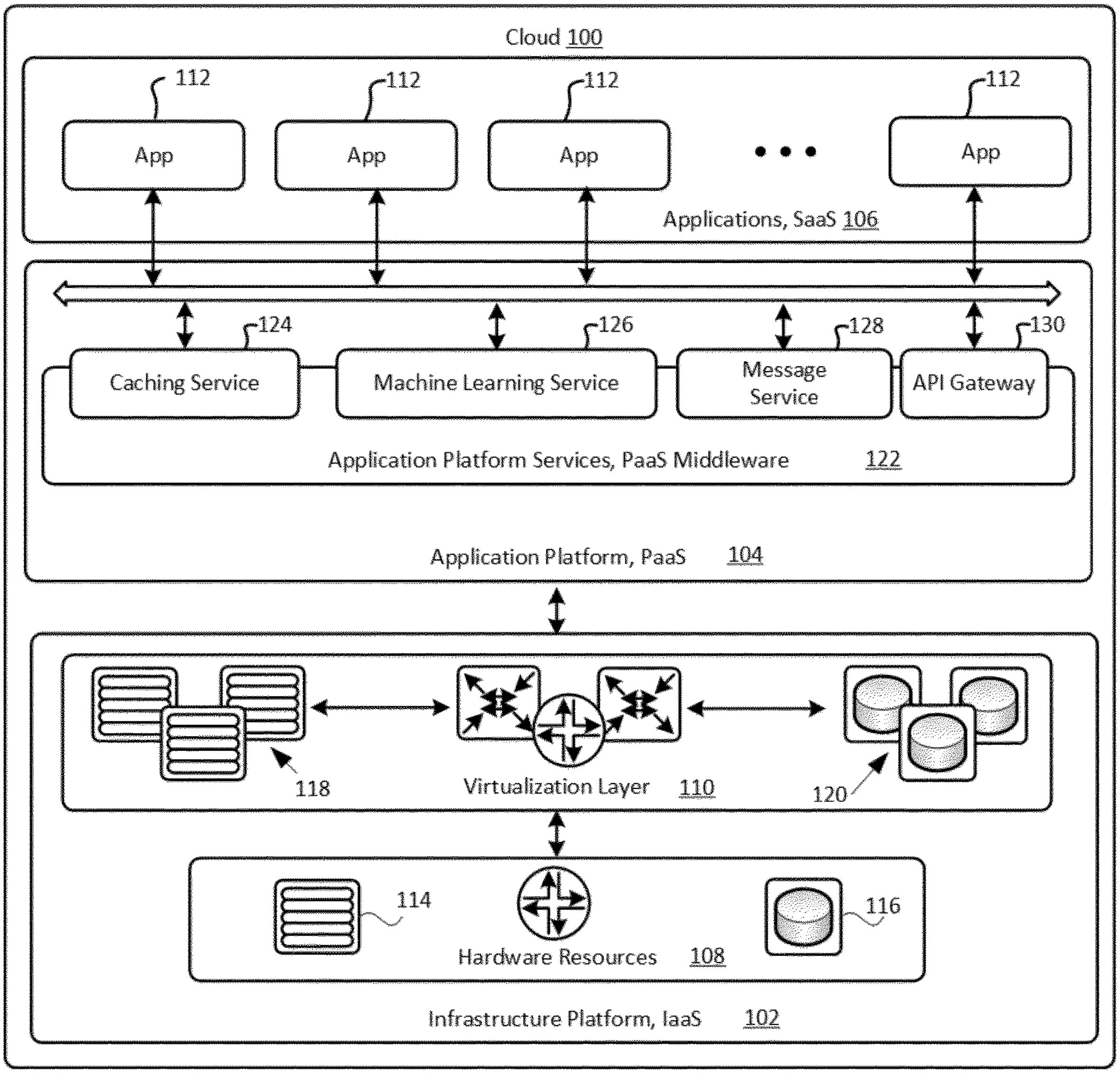
FIG. 1 is a block diagram illustrating a cloud computing system for delivering an elastic machine learning as a service (MLaaS) among other cloud computing services, in accordance with example embodiments described herein.

FIG. 1 is a logical block diagram schematically illustrating a cloud computing system that can deliver cloud computing services. The illustrated logical diagram of the cloud computing system 100 (referred to hereinafter as the cloud 100) generally comprises an infrastructure platform 102 (e.g., infrastructure as a service (IaaS) layer), an application platform 104 (e.g., platform as a service (PaaS) layer), and applications 106 (e.g., software as a service (SaaS) layer). The infrastructure platform 102 comprises the physical hardware resources 108, and a virtualization layer 110 that presents an abstraction of the physical hardware resources 108 to the application platform 104. The abstraction presented by the virtualization layer 110 depends on the requirements of the applications 112 being hosted on the application platform 104. The physical hardware resources 108 include physical machines or servers 114 that include physical processing resources 114 (e.g., processor devices such as central processing units (CPUs), graphic processing units (GPUs), accelerators, and/or tensor processing units (TPUs)), physical storage servers 116 that include storage resources such as memory (e.g., static random access memory (SRAM), dynamic random access memory (DRAM), synchronous DRAM (SDRAM), read-only memory (ROM), persistent storage devices (e.g., hard disk drives, optical drives, or a combination thereof), and networking resources (not shown) that are generally resident within a data center. A data center, as will be understood in the art, includes a collection of the physical hardware resources 108 (typically in the form of servers) that can be used as a collective computing resource comprising processing, storage, and networking resources. Within a data center, a plurality of servers can be connected together to provide a computing resource pool upon which virtualized entities can be instantiated. Data centers can be interconnected with each other to form pools of computing resources connected to each by connectivity resources. The connectivity resources may take the form of physical connections such as Ethernet or optical communications link.

In the context of the present disclosure, the physical processing resources 114 may include a plurality of processor devices dedicated for use by the examples described herein. These dedicated processor devices may be organized into "nodes", wherein each node includes two or more of the processor devices (e.g., 8 processor devices, such as GPUs, in a node). Each node may also include other resources in some embodiments, such as a memory cache for use by the processor devices of the node. The plurality of nodes dedicated for use by the examples described herein may be referred to herein as a "cloud computing resource pool" or simply a "resource pool". In some examples, the cloud computing resource pool may also include other computing resources aside from the nodes, such as memories or communication links to facilitate the computations performed by the nodes. In some examples, the resource pool may encompass a fixed number of nodes, but the specific hardware devices (e.g. processor devices) defining the nodes may change from time to time due to virtualization of the hardware resources 108 of the cloud 100. In some examples, the number of nodes included in the resource pool may change from time to time; in some such examples, the methods and operations described herein may automatically adjust to the change in the number of nodes of the resource pool by using the new number of nodes in the various computing operations described herein.

The virtualization layer 110 supports a flexible and efficient multi-tenancy run-time and hosting environment for applications 112 by providing IaaS facilities. The virtualization layer 110 includes a virtualization manager or hypervisor (not shown) that may provide a security and resource "sandbox" for each application 112 being hosted by the application platform 104. Each "sandbox" may be implemented as a Virtual Machine (VM) 118 that may include an appropriate operating system and controlled access to virtualized storage resources 120.

The virtualization of the physical hardware resources 108 by the virtualization layer 110 is considered to be foundational technology for the cloud 100. Virtualization of is a technology that allows for the creation of virtual computing resource pools of computing resources (e.g., processing, storage, and networking resources) connected to each by connectivity resources. Virtualization may take the form of instantiating VMs 118 that, to another entity on a network and to software executed on the VM 118, is no different than a physical computing device. A VM 118 has its own set of computing resources (e.g., processing, storage, and connectivity resources), upon which an operating system can be executed. The VM 118 can have a virtual network interface that can be assigned a network address. Between the underlying resources and the VM 118, there is typically a hypervisor (not shown) that manages the resource isolation and network interactions. One of the purposes of a VM 118 is to provide isolation from other processes running on the cloud 100. When initially developed, a VM 118 was a mechanism to allow different processes to operate without concern that a single errant process would be able to cause a complete system crash. Instead, an errant process would be contained to its own VM 118. This isolation allows for each VM 118 to have its own set of network interfaces. Typically, a single underlying computing resource can support a plurality of virtualized entities.

It will be appreciated by those skilled in the art that a more recent development has been the use of containers in place of VMs 118. As mentioned above, each VM 118 typically includes its own operating system which typically increases redundant computing, storage, and connectivity resource usage. Containers allow a single operating system (OS) kernel to support a number of isolated applications. In place of a hypervisor that allows each VM 118 to run its own OS, a single OS hosts containers that are responsible for enforcing the resource isolation that would otherwise be provided by the VM 118.

The application platform 104 provides the capabilities for hosting applications 112 and includes application platform services 122. The application platform services 122 provide a set of middleware application services and infrastructure services to the applications 112 hosted on the application platform 104. Applications 112 hosted on the application platform 104 may run on either the VMs or the physical machines. In the example depicted in FIG. 1, the application platform services 122 include a cache service system 124 for in-memory data storage, a message service 128 for publishing messages to subscriber customers, and an application program interface (API) gateway service 130 that enables customers to create, publish, and maintain APIs to access other cloud services. It will be appreciated by those skilled in the art that the application platform services 112 may provide other middleware application services to customers, such as notification services, run-time services, database services, and the like. Applications 112 from customers may be deployed and executed within a respective VM 118 or physical machine 114.

The application platform services 122 also include a machine learning service 126 (otherwise referred to as a MLaaS) that includes an elastic training module 200 configured to perform the methods and operations described in greater detail herein.

Example Elastic Training Module

Figure 2:
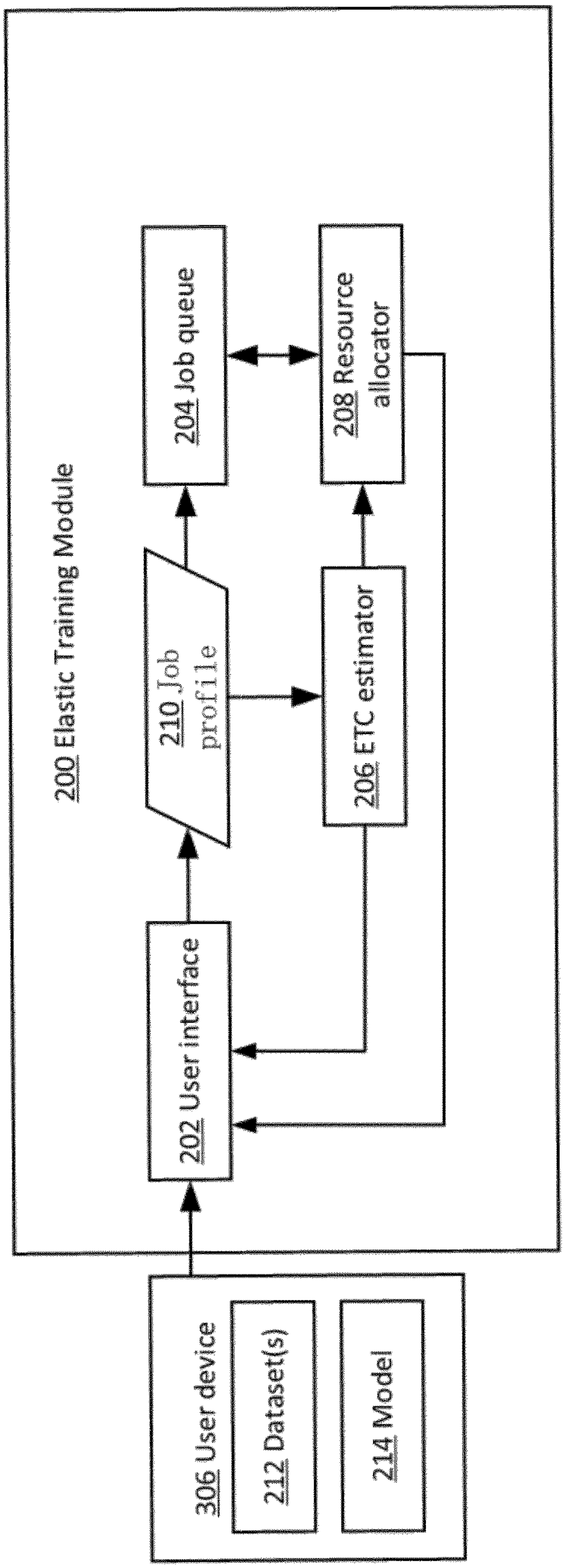
FIG. 2 is a block diagram of an example elastic training module, in accordance with example embodiments described herein.

FIG. 2 illustrates an example elastic training module 200 implemented by the MLaaS 126 of the cloud computing system 100 of FIG. 1. The elastic training module 200 may be executed by one or more virtual machines 118 provided by virtualization layer 110 of the cloud computing system 100. The elastic training module 200 is configured to provide a training service that trains a deep learning model 214.

The elastic training module 200 includes a number of sub-modules, such as a user interface 202, a job queue 204, an estimated time to completion (ETC) estimator 206, and a resource allocator 208. The user interface 202 receives job profiles 210 from user devices 306 in communication with the cloud computing system. A job profile 210 includes training data used for a training job that is used to train the deep learning model 214 (referred to as model 214), and may include or identify the model 214 to be trained and one or more training and/or validation datasets 212: a training dataset is used in training the model 214, and a validation dataset is used in testing the trained deep learning model that results when the training job is completed. Whereas the model 214 and dataset(s) 212 are shown as resident on the user device 306 in FIG. 2, in some embodiments the model 214, dataset(s) 212, and/or other training information may be resident on another device, such as a device within the cloud computing system 100.

A new training job based on a received job profile 210 may be placed in the job queue 204 if there are not currently enough resources to begin performing the training job. The resource allocator 208 makes resource allocation decisions to perform the ongoing training jobs and manage the job queue 204 according to the methods described herein. The decisions of the resource allocator are based on ETC estimates generated by the ETC estimator 206 based on the received job profiles 210 and/or progress data for ongoing training jobs. The user interface 202 is also used to communicate the results of a completed training job, and/or the current progress of an ongoing or queued training job, to the user device 306. The operations of the various sub-modules 202, 204, 206, 208 are described in greater detail below with reference to FIGS. 4-11.

Example Elastic Training System

Figure 3:
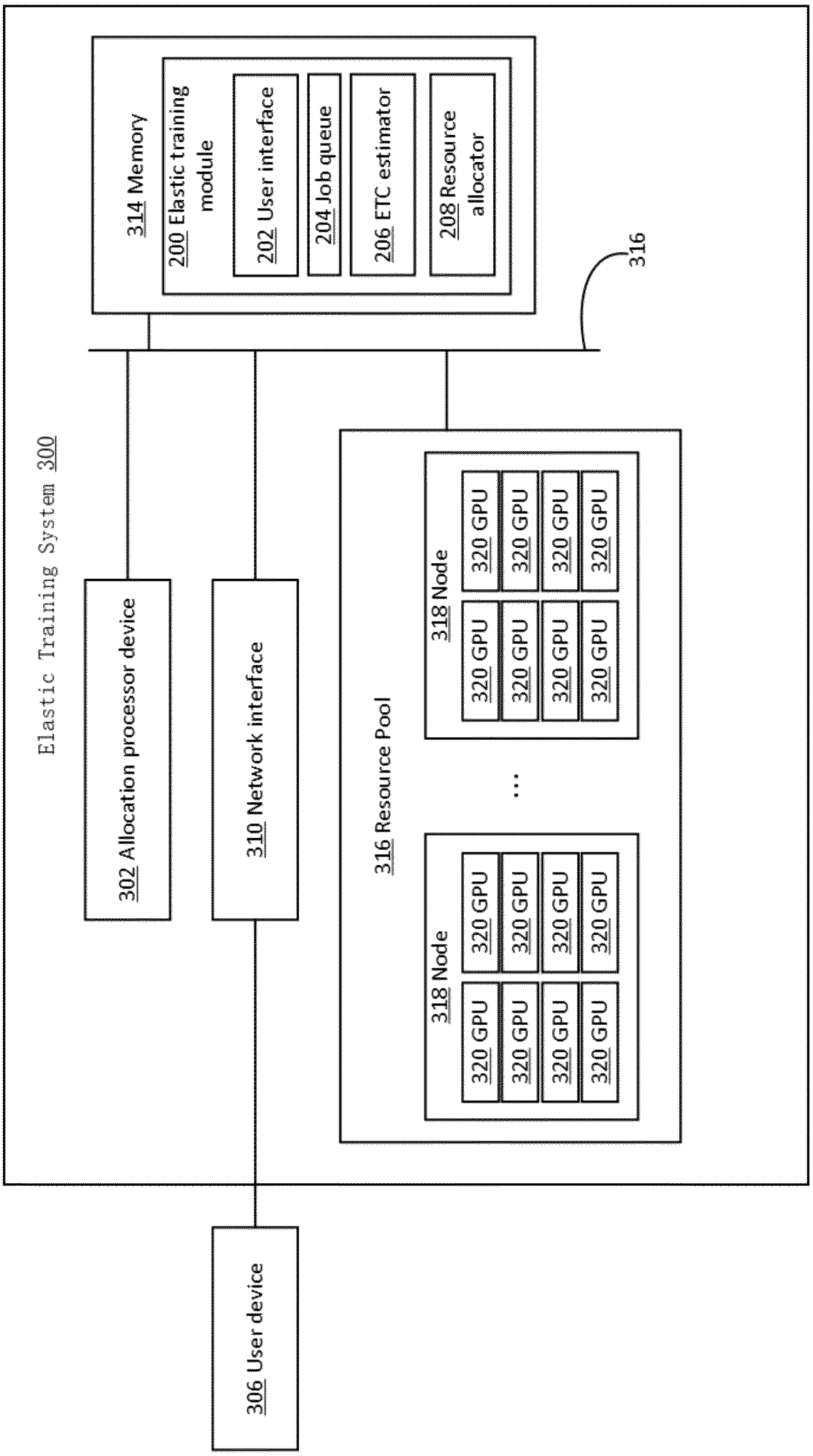
FIG. 3 is a block diagram of an example elastic training system suitable for implementing the example elastic training module of FIG. 2.

FIG. 3 is a block diagram of an example elastic training system 300 comprising computing hardware suitable for implementing the example elastic training module 200 of FIG. 2. The example elastic training system 300 is described as an alternative to the cloud computing system 100 of FIG. 1; both systems are configured to implement the elastic training module 200 of FIG. 2, and references to the operations of the elastic training system 300 in implementing the elastic training module 200 may be understood to apply equally to the implementation of the elastic training module 200 by the cloud computing system 100. It will be appreciated that some components of the elastic training system 300 shown in FIG. 3 may correspond to virtual and/or hardware resources of the virtualization layer 110 and/or hardware resources 108 of the cloud computing system 100, as described below. Other examples suitable for implementing embodiments described in the present disclosure may be used, which may include components different from those discussed below. Although FIG. 3 shows a single instance of each component, there may be multiple instances of each component in the elastic training system 300.

The elastic training system 300 may include one or more allocation processor devices (collectively referred to as allocation processor device 302, and also referred to as a resource allocation processor device) used to implement the resource allocator 208 and other sub-modules of the elastic training module 200. The allocation processor device 302 may include one or more processor devices such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The allocation processor device 302 may correspond to part of the physical processing resources 114 of the physical hardware resources 108 of the cloud computing system 100.

The elastic training system 300 may include one or more network interfaces (collectively referred to as network interface 310) for wired or wireless communication with entities within, or in communication with, the cloud computing system 100. The network interface 310 may correspond to part of the networking resources of the physical hardware resources 108 of the cloud computing system 100.

The elastic training system 300 may include one or more non-transitory memories (referred to collectively as a memory 314), which may include a volatile or non-volatile memory (e.g., a flash memory, a random access memory (RAM), and/or a read-only memory (ROM)). The memory 314 may also include one or more mass storage units, such as a solid state drive, a hard disk drive, a magnetic disk drive and/or an optical disk drive. The memory 314 may correspond to part of the physical storage servers 116 of the physical hardware resources 108 of the cloud computing system 100.

The memory 314 may store instructions for execution by the allocation processing device 302 to carry out examples described in the present disclosure. The instructions may include instructions for implementing and operating the elastic training module 200 of FIG. 2, including its submodules 202, 204, 206, 208. The memory 314 may include other software instructions, such as for implementing an operating system and other applications/functions. In some examples, the elastic training system 300 may additionally or alternatively execute instructions from an external memory (e.g., an external drive in wired or wireless communication with the elastic training system 300) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The elastic training system 300 may include a cloud computing resource pool 316, comprising a plurality of nodes 318. Each node includes one or more processor devices 320 (shown as 8 GPUs per node) and may also include other components, such as a cache, to assist with the computations performed by the processor devices of the node. In some examples, the number of nodes 318 included in the cloud computing resource pool 316 is on the order of 100 nodes 318. The cloud computing resource pool 316 may correspond to all or part of the physical processing resources 114 of the physical hardware resources 108 of the cloud computing system 100.

The elastic training system 300 may also include a bus 316 providing communication among components of the elastic training system 300, including those components discussed above. The bus 316 may be any suitable bus architecture including, for example, a memory bus, a peripheral bus or a video bus, or it may be another communication link such as a network interface 310.

Example User Input Screen

Figure 4:
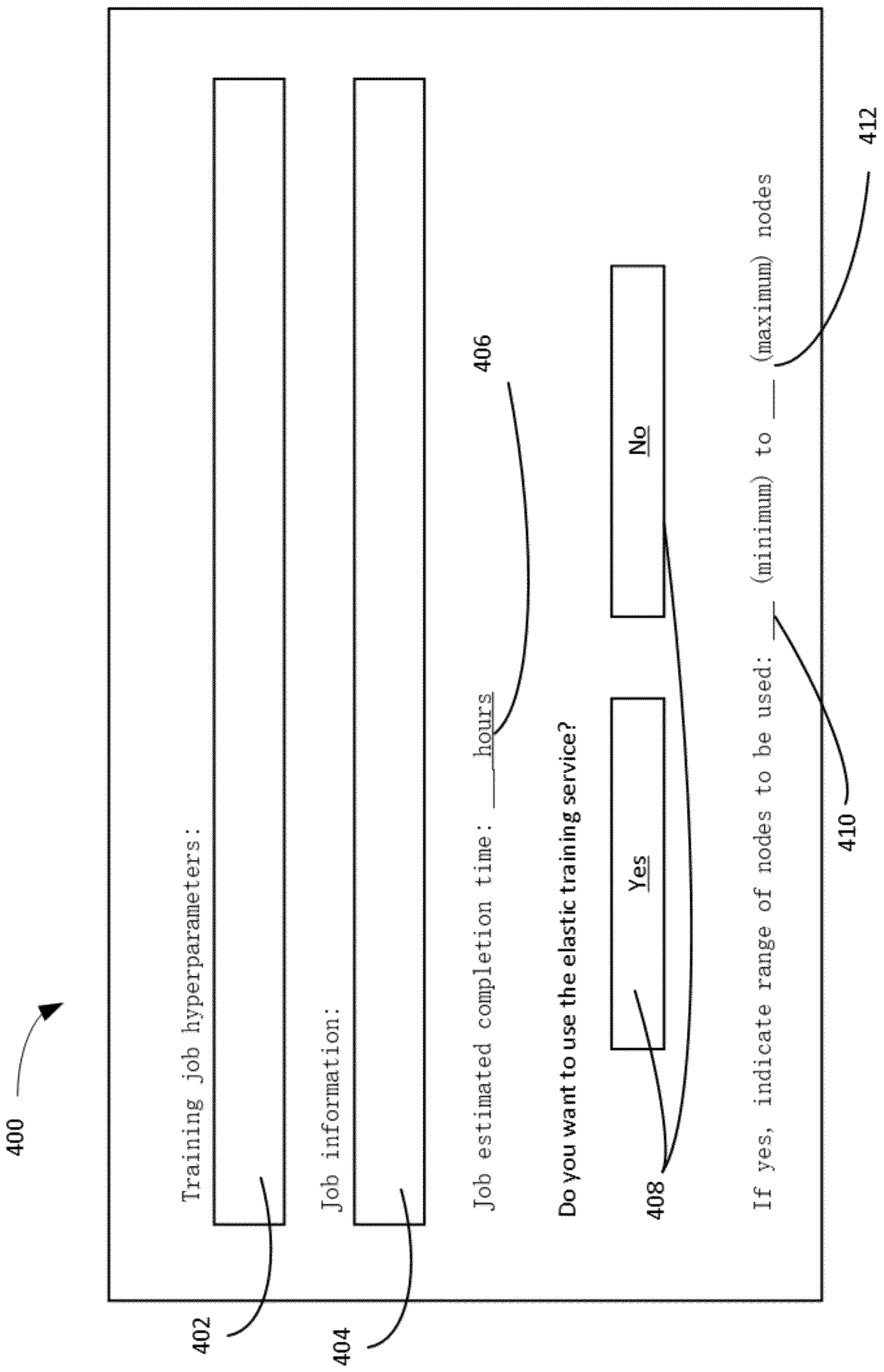
FIG. 4 is an example user interface screen generated by a user interface of the example elastic training module of FIG. 2.

FIG. 4 illustrates an example job profile submission user interface (UI) screen 400 generated by the user interface 202 of the elastic training module 200. The UI screen 400 includes user input areas including a hyperparameter input area 402, a job information input area 404, an elastic training service selection input area 408, a minimum node count input area 410, and a maximum node count input area 412. The screen 400 also includes user output areas including an ETC estimate output area 406.

When a user submits a job to the elastic training system 300 (e.g., via user device 306), the job profile submission UI screen is generated by the user interface 202 and transmitted to the user device 306 to be displayed on a display screen of the user device 306. The job profile submission UI screen 400 enables a user to enter, for the training job being submitted, training job hyperparameters (hyperparameter input area 402) and other training information (at job information input area 404). The training job hyperparameters and other training information may specify all of the information needed for the elastic training system 300 to perform the training job: for example, the architecture of the model, an objective function, a training batch size, a number of training epochs, a learning rate, etc. The other training information may indicate a job type (e.g., computer vision, natural language processing, speech recognition, etc.), libraries, datasets (such as one or more training datasets), engines (e.g., PyTorch, TensorFlow, etc.), a user identifier, and any other information that may be needed to perform the training job. It will be appreciated that various types of training jobs for training deep learning models may require other types of information.

The training information also includes information relating to the elastic training module 200: the user may opt whether or not to use the elastic training module (at elastic training service selection input area 408), and if so, may input a minimum value for the node count of the training job (at minimum node count input area 410), and a maximum value for the node count of the training job (at maximum node count input area 412). The training information is received by the user interface 202 and is used to define a job profile 210. The job profile 210 is provided to the ETC estimator 206, which computes an ETC estimate of the training job and sends the ETC estimate to the user interface 202 for generation of an updated version of the UI screen 400 to send to the user device 306, showing the ETC estimate at the ETC estimate output area 406.

In some embodiments, the information relating to the elastic training module 200 may be presented to the user after the user has been shown the ETC estimate as described below.

If the user opts not to use the elastic training module 200 to allocate computing resources to the training job, the elastic training system 300 may allocate a fixed number of nodes to perform the training job. The fixed number of nodes may be a predetermined number, such as one node, and does not change during performance of the training job. The training job, when initially received, may be added to the job queue 204 as described below. However, once removed from the job queue 204 and added to the list of ongoing training jobs, the training job only ever has the fixed number of nodes allocated to it, and these nodes may be considered to be removed from the cloud computing resource pool 316 until the training job completes.

If the user opts to use the elastic training module 200 to allocate computing resources to the training job, the elastic training system 300 manages the training job as described below with reference to FIGS. 5-11. The nodes 318 allocated to the training job by the resource allocator 208 may range from the minimum value to the maximum value indicated by the user in the UI screen 400.

In some embodiments, the training information entered into the hyperparameter input area 402 and/or job information input area 404 may be referred to as first user input, and the minimum node count value and maximum node count values entered at the minimum node count input area 410 and maximum node count input area 412 may be referred to as a second user input. The first user input may be used by the ETC estimator 206 to generate the ETC estimate displayed at the ETC estimate output area 406, which may occur before the user inputs the second user input. The user selection at the elastic training service selection input area 408 may also be considered part of the second user input.

In some embodiments, the actual maximum node count value used by the elastic training system 300 may be obtained as the lower of a node count cap value (e.g. a predetermined node count cap set by a system administrator or by a configuration value stored in the memory 314) and the user input node count maximum value indicated by the second user input at maximum node count input area 412.

In some examples, if the user opts to use the fixed number of nodes to perform the training job at the elastic training service selection input area 408, the minimum value and the maximum value of the job's node count are obtained by, first, determining that the training job should use a fixed node count based on the second user input (i.e. the use selection at the elastic training service selection input area 408), and second, setting both the maximum value and minimum value of the node count for the training job to the predetermined fixed node count value (e.g., one node).

The user interface 202 may generate and send to the user device 306 one or more additional types of UI screens (not shown) while the job is being managed. Some such UI screens may indicate the status of the training job (e.g., position in the job queue 204, estimated time remaining in the job queue 204, ongoing), the ETC of the training job (including total training time and/or remaining training time), and/or a total time saved by using the elastic training module 200. The total time saved may be an estimated training time savings based on the total training time (i.e. the ETC estimated by the ETC estimator 206 of the elastic training module 200) and a fixed-allocation ETC for the first training job premised on the use of the fixed number of nodes to perform the training job. Thus, for example, if the fixed number of nodes is one, the user enters a range of 1 to 10 nodes for use of the elastic training module 200, resulting in an ETC estimate of 1.5 hours for the user's training job, and the ETC estimate for use of a single node to perform the user's training job is 3.8 hours, then the total time saved may be shown as 2.3 hours.

The user output information shown in the further UI screens may also include training time allocation information indicating changes in the number of nodes allocated to the training job over the total training time, and/or over training time to date. For example, the further UI screen may show a visual representation of node counts over time allocated to the user's training job, showing scaling-up and scaling-down events, such as the visual representations of jobs shown in FIG. 6 and FIG. 8.

Example Resource Allocation Sequence

The resource allocator 208 operates in conjunction with the job queue 204 and the ETC estimator 206 to schedule the performance of training jobs and allocate nodes 318 to ongoing training jobs (i.e., training jobs no longer in the job queue 204 and currently being performed using one or more nodes 318). Unlike existing approaches using GPU-level resource allocation, which is a form of process management, examples described herein perform resource allocation at the node level, thereby implementing a form of cluster management or container management. Process management manages the execution of individual software processes by individual processor cores. Cluster management and container management both refers to the management of containers (i.e. a bundle of a software program and its data dependencies) and their execution by virtualized clusters of processing resources.

Figure 9:
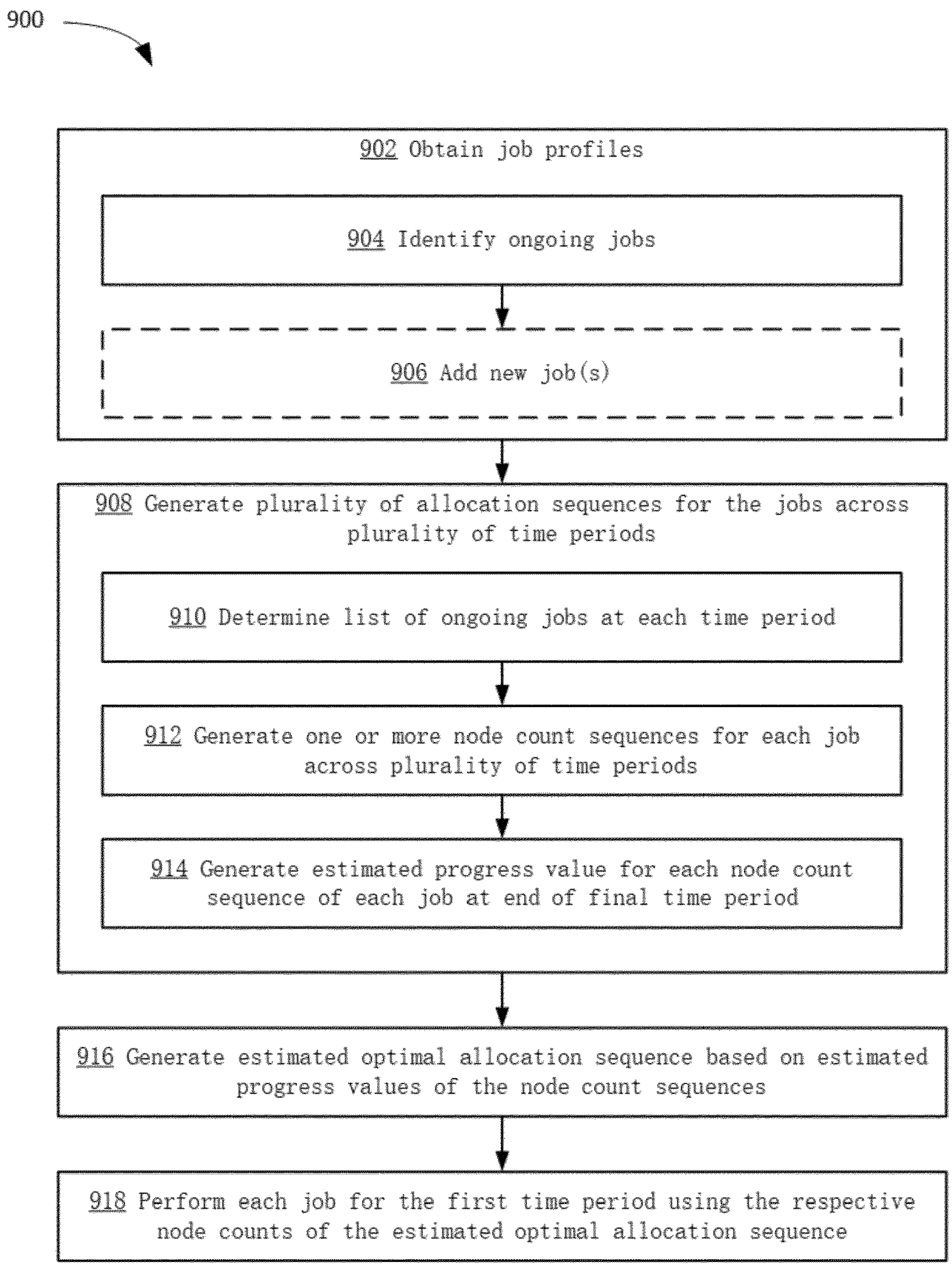
FIG. 9 is a flowchart showing operations of an example method for training a plurality of models using a cloud computing resource pool, in accordance with example embodiments described herein.
Figure 10:
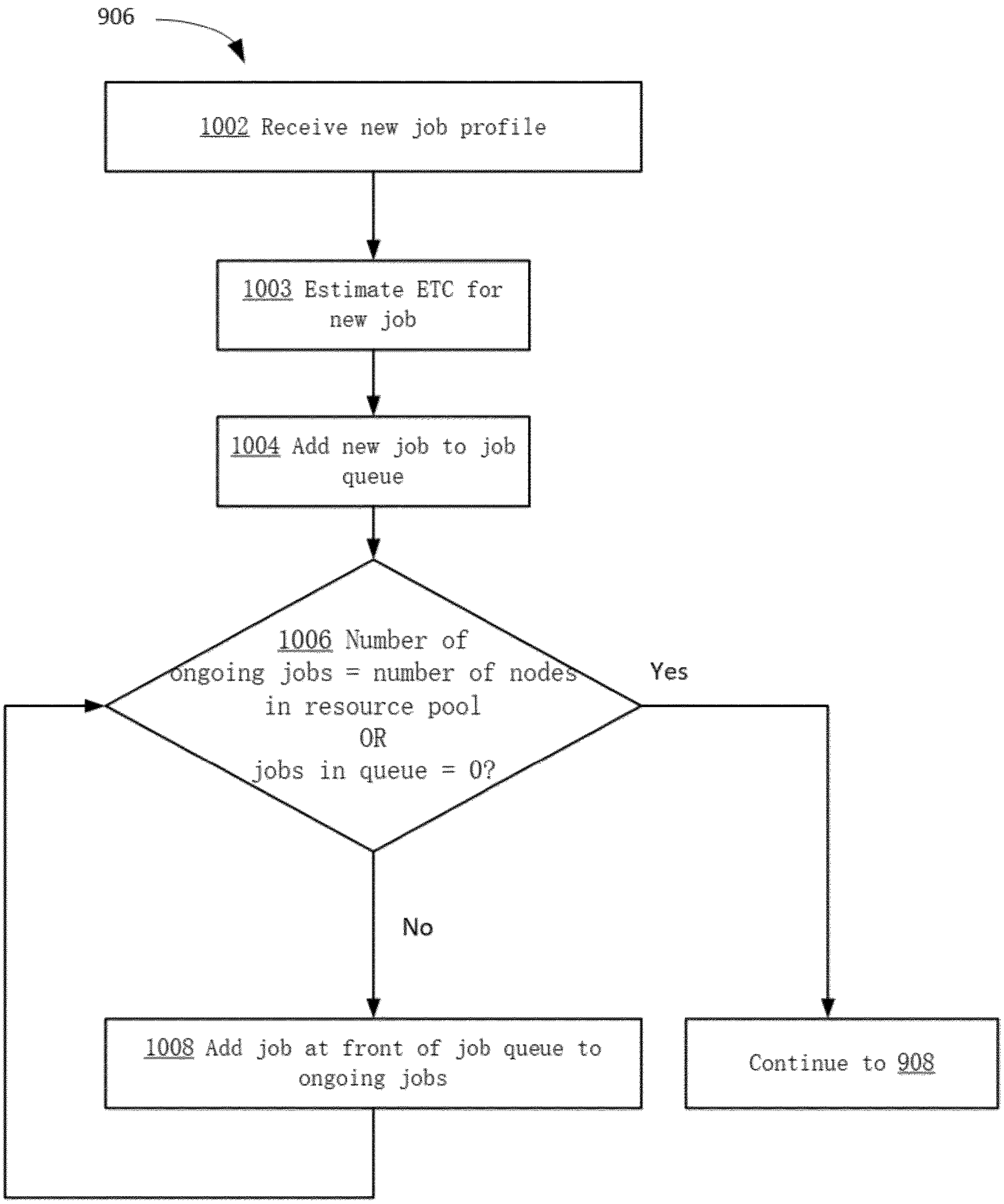
FIG. 10 is flowchart showing sub-operations of the operation of adding new jobs of the method of FIG. 9.

FIG. 10 is flowchart showing operations performed by the elastic training module 200 when a new training job (also called the "new job") is received. The operations shown in FIG. 10 and described below may be considered sub-operations of operation 906 described below with reference to FIG. 9.

At 1002, the job profile 210 for the new job is received by the ETC estimator 206 from the user interface 202. At 1003, the ETC estimator 206 estimates an ETC estimate for the new job. The ETC estimate includes estimates of a total duration of training time for the new job, a remaining duration of training time for the new job, and/or a point in time at which the new job will be complete.

The ETC estimator 206 generates the ETC estimate for the new job based on the training information in the job profile 210. In some embodiments, the lifecycle of a training job consists of four stages: initiate, download, compute, and upload. The time spent for the four stages is denoted as $T_{init}$, $T_{down}$, $T_{comp}$, and $T_{up}$, respectively. Thus, the ETC estimate may include an estimated total duration of training time $ETC=T_{init}+T_{down}+T_{comp}+T_{up}$.

In some embodiments, the ETC estimator 206 includes one or more regression models to estimate the durations of the various stages of the training job lifecycle. Historical data from past training jobs performed by the elastic training system 300 is used to train four regression models using machine learning. The regression models are trained to estimate the time spent at each of the four stages. The initiate time $T_{init}$ is predicted by a first regression model using portions of the training information, such as job type and libraries, as input. The download time $T_{down}$ is predicted by a second regression model using portions of the training information, such as the training dataset(s), as input. The compute time $T_{comp}$ is predicted by a third regression model using portions of the training information, such as the batch size, number of epochs, learning rate, job type, engine, user identifier, and training dataset(s), as input. The third regression model is typically more complex than the other regression models due to the large number of inputs potentially affecting compute time for a given training job. The upload time $T_{up}$ is predicted by a second regression model using portions of the training information, such as the job type, as input. After the ETC estimate is computed for the new job, the ETC estimate may be provided to the user interface 202 for communication to the user (e.g. in ETC estimate output area 406). The ETC estimate is also provided to the resource allocator 208 to assist the resource allocator 208 in allocating resources, as described in greater detail below with reference to FIGS. 5-9.

At 1004, the elastic training module 200 places the new job in the job queue 204. In some embodiments, placing a training job in the job queue 204 means that the job profile 210 is stored in the memory 314 in association with a job identifier, and the job identifier is associated with a position in the job queue 204. The job queue operates on conventional queueing principles: the first training job placed in the job queue 204 is the first training job to be removed from the job queue 204 to begin execution.

At 1006, the number of ongoing training jobs (i.e. the number of training jobs currently being performed by one or more nodes 318) is compared to the number of nodes 318 in the resource pool 316, and the presence (or number) of jobs in the job queue 204 is also checked.

If operation 1006 determines that there are more nodes 318 than ongoing training jobs (ongoing jobs !=nodes in resource pool), and there are jobs in the job queue 204 (jobs in queue !=0), then at operation 1008 the training job at the front of the job queue 204 (i.e. the training job that has been in the job queue 204 for the longest period of time) is removed from the job queue 204 and has resources allocated for its performance by the resource allocator 208, as described in greater detail below. After operation 1008, operation 1006 is performed again, and additional jobs may be removed from the job queue 204 and added to the list of ongoing jobs as long as there are more nodes 318 than ongoing jobs.

In some examples, the training job at the front of the job queue 204 may be the new job, which thus passes directly out of the job queue 204 at operation 1008 after being placed into it at operation 1004. Accordingly, in some embodiments, operation 1004 may be performed after comparison 1006 is performed, i.e. the new job is only added to the job queue 204 if there are more ongoing training jobs than the number of nodes, otherwise the new job has resources allocated to it immediately without it being placed in the job queue 204.

In some embodiments, the condition checked at operation 1006 is different. Some embodiments may place further constraints on when a training job should be removed from the job queue 204; for example, some embodiments may not permit certain ongoing jobs from being down-scaled below a certain number of nodes 318 that is greater than one.

If operation 1006 determines that there are not more nodes 318 than ongoing training jobs (ongoing jobs=nodes in resource pool), or there are no jobs in the job queue 204 (jobs in queue=0), then the operation 906 of receiving a new job shown in FIG. 9 is complete, and the method 900 of FIG. 9 proceeds to operation 908.

The resource allocator 208, the job queue 204, and the ETC estimator 206 work cooperatively over time to monitor the status of ongoing training jobs and training jobs in the job queue 204, to allocate computing resources (i.e. nodes 318) to ongoing training jobs, and to remove jobs from the job queue 204. The operation of these three sub-modules 204, 206, 208 is performed according to a schedule defined by an elastic training frequency, denoted as f, which may be predetermined based on configuration values and may be set or modified by an administrative user of the elastic training system 300, e.g. a system administrator. Based on elastic training frequency f defining an update interval, e.g. every 5 minutes, the resource allocator 208 performs a set of resource allocation decisions. In some embodiments, the technique used by the resource allocator 208 may be a mathematical optimization technique for mixed-integer linear programs (MILP). After the resource allocator 208 has performed the resource allocation decisions, the output of the resource allocation decision operation is used to allocate node 318 from the resource pool 316 to one or more ongoing jobs and may be used to remove one or more training jobs from the job queue 204.

The resource allocator performs its resource allocation decisions based on a number of information inputs maintained in the memory 314: a list of active training jobs (i.e. ongoing jobs being performed and training jobs in the job queue 204), denoted as I; a total number of nodes 318 in the resource pool 316, denoted as N (e.g., N=100); a remaining ETC estimate for each training job i, denoted as $d_i$, i∈I, generated by the ETC estimator 206; a node count range (i.e. between a minimum value and a maximum value, inclusively) for job i, denoted as $n_{i,min}$~$n_{i,max}$, i∈I, obtained from the user interface 202 (e.g. from minimum node count input area 410 and maximum node count input area 412 respectively); and a duration of a look-ahead time horizon, denoted as T, which may be defined by a system setting selected by the system administrator. The resource allocation decisions performed by the resource allocator 208 at each update interval defined by elastic training frequency f are described with reference to FIGS. 5-9 below.

Figure 5:
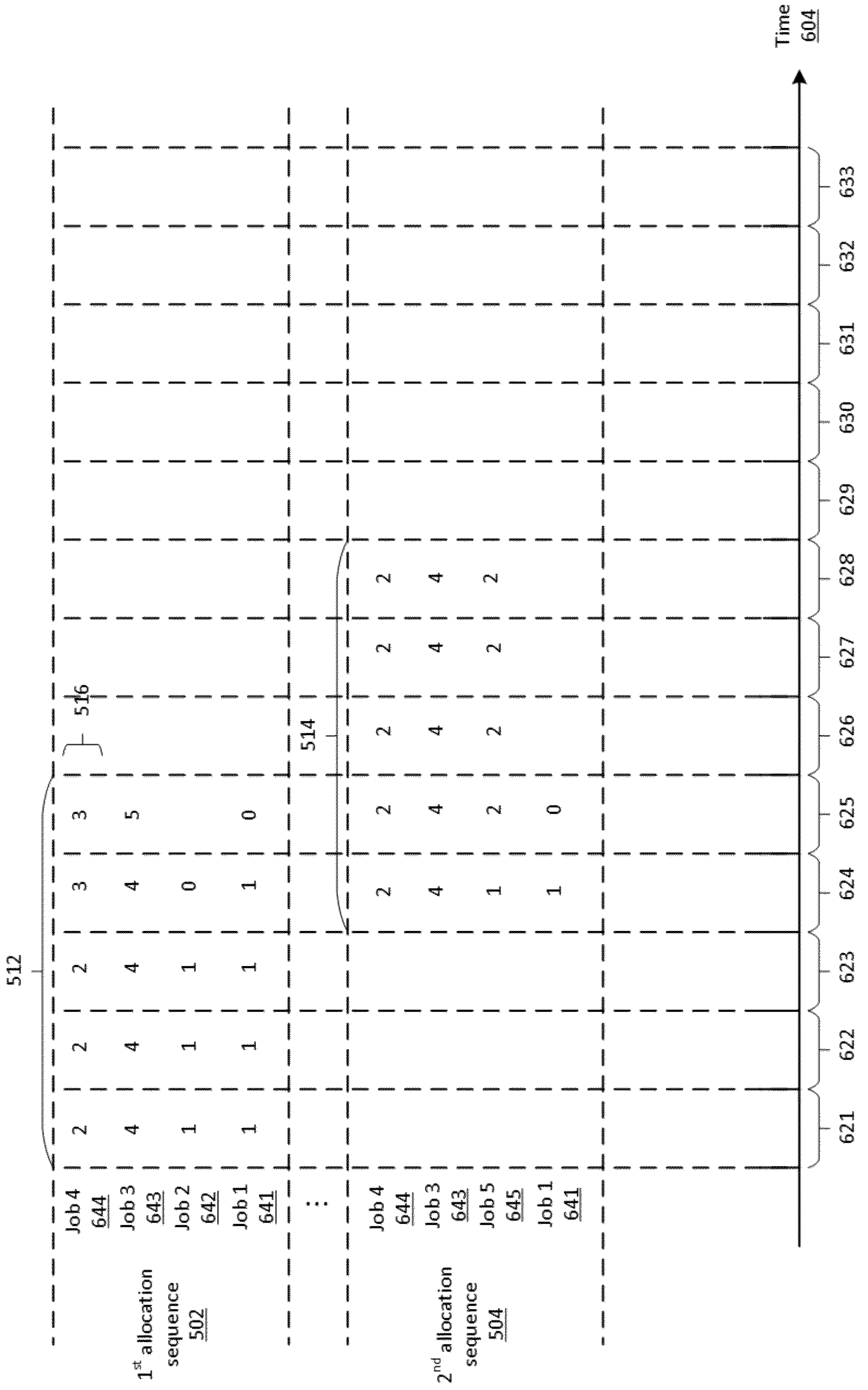
FIG. 5 is a table showing two example allocation sequences generated by the resource allocator of the example elastic training module of FIG. 2.

FIG. 5 is a table showing two example allocation sequences 502, 504 generated by the resource allocator 208 at two different update intervals. The horizontal axis of the table is time 604. The resource allocator 208 discretizes the look-ahead time horizon T into a plurality of time periods t∈T={1, 2, 3, . . . }. In some embodiments, such as those described herein, the duration of each time period equals the update interval defined by elastic training frequency f, e.g. 5 minutes. However, in some embodiments the update interval may be shorter than the duration of each time period. In the example of FIG. 5, the resource allocator 208 has discretized the look-ahead time horizon T=25 minutes (shown as time horizon 512 for the first allocation sequence 502) into five time periods (shown as time periods 621-625 for the first allocation sequence 502), each of which is t=5 minutes long. It will be appreciated that these values are provided as a simplified example only, and various embodiments may use any number of time periods per time horizon and/or time horizons and update intervals of any duration.

The simplified example shown in FIG. 5 assumes a resource pool 316 consisting of only 8 nodes 318, i.e. N=8; it will be appreciated that in some embodiments this number may be much larger, e.g., N=100. To determine the first allocation sequence 502 at the beginning of time period 521, the resource allocator 208 determines a number of nodes for each ongoing job (shown as job 1 641 through job 4 644) for each time period 521-525 within the time horizon 512. In the example first allocation sequence 502, job 1 641 is allocated 1 node 318 for each of time periods 621-624, and then zero nodes (indicating completion) at time period 625. Each of the other three jobs 642-644 is also allocated a number of nodes 318 at each time period 621-625 of the first allocation sequence 502. At each time period 621-625, the total number of nodes allocated is 8, i.e. the total number of nodes 318 in the resource pool 316 N. When job 2 642 completes at the end of time period 623, its single node is freed up for allocation to another ongoing job, in this case job 4 644, which increases its node allocation from 2 to 3 starting at time period 624. This increase in node allocation to a training job is referred to herein as "up-scaling" or "scaling up". Similarly, in some examples an ongoing job may have its node allocation decreased (to a minimum of 1 node while the job is ongoing); this is referred to herein as "down-scaling" or "scaling down".

The second allocation sequence 504 is generated by the resource allocator 208 three update intervals later than the first allocation sequence 502, at the beginning of time period 624, covering second time horizon 514. A new job, job 5 645, has been received according to the operations shown in FIG. 10 described above. This change to the list of ongoing jobs created by the addition of job 5 645 results in a re-allocation of nodes 318 for the time periods starting at time period 624. Instead of the allocations for time period 624 shown in the first allocation sequence 502 (i.e., job 1 641 allocated 1 node, job 2 642 has just completed, job 3 643 allocated 4 nodes, and job 4 644 allocated 3 nodes), the resource allocator 208 now allocates the nodes 318 as shown in the second resource allocation 504 (i.e., job 1 641 allocated 1 node, job 3 643 allocated 4 nodes, job 4 644 allocated 2 nodes, and job 5 645 allocated 1 node). The subsequent time periods 625-628 of the second allocation sequence 504 are similarly re-determined based on the current list of ongoing jobs at the time the second allocation sequence 504 is generated (i.e. time period 624).

Each allocation sequence 502, 504 thus includes, for each ongoing training job included in the allocation sequence, a node count sequence indicating a node count for the training job at each of a plurality of time periods within the time horizon of the allocation sequence. Thus, for example, the node count sequence 516 for job 4 644 in the first allocation sequence 502 is (2, 2, 2, 3, 3) corresponding to time periods (621, 622, 623, 624, 625). A time horizon 512, 514 of an allocation sequence 502, 504 consists of a plurality of time periods (e.g., 621-625) beginning with a first time period (e.g. 621) and ending with a final time period (e.g. 625).

In some embodiments, the list of all active jobs I, which includes all jobs placed in the job queue 204, is used by the resource allocator 208 to generate allocation sequences. Thus, if one or more jobs were waiting in the job queue 204 at the time the allocation sequence was being generated, but the number of ongoing jobs was equal to the number of nodes 318 (as determined at step 1006 of FIG. 10 described above), the resource allocator 208 would be unable to allocate any nodes 318 to the job waiting in the job queue 204 for the first time period of the allocation sequence. However, if the resource allocator 208 expected one of the ongoing jobs to complete at a time period within the current time horizon, thereby freeing up its node(s) 318, then the resource allocator 208 would generate the allocation sequence such that one or more nodes 318 are allocated to the job waiting in the queue beginning at the time period after completion of the ongoing job.

Figure 6:
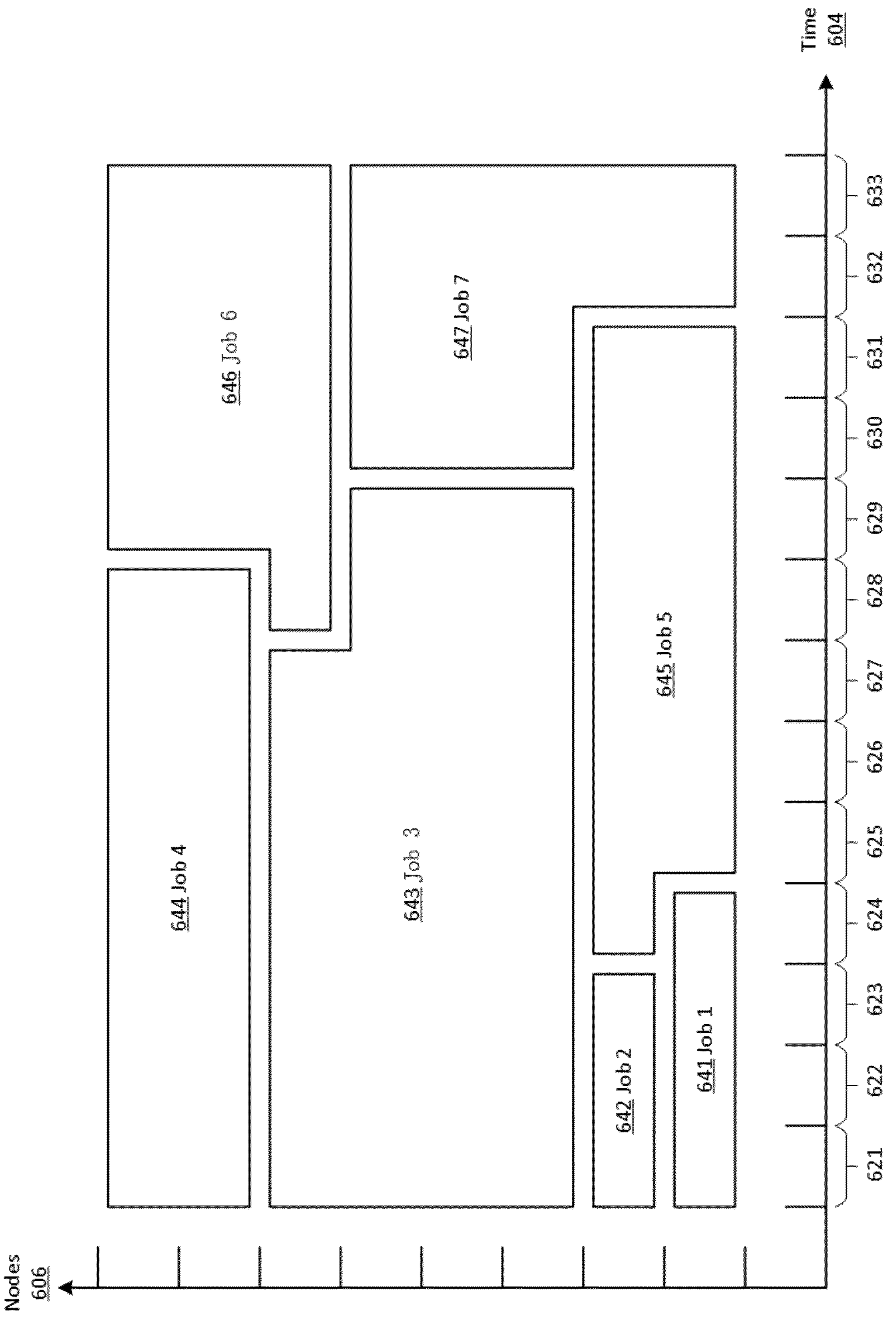
FIG. 6 is a graph showing node counts allocated to training jobs over a plurality of time periods by the resource allocator of the example elastic training module of FIG. 2.

FIG. 6 is a graph showing node counts allocated to training jobs over a plurality of time periods by the resource allocator 208, consistent with the allocation sequences 502, 504 of FIG. 5. The horizontal axis is time 604, and the vertical axis is the number of nodes 606 of the resource pool allocated to each job. The nodes allocated to each job in time periods 621-623 is consistent with the first allocation sequence 502: job 1 641 is allocated 1 node, job 2 643 is allocated 1 node, job 3 643 is allocated 4 nodes, and job 4 644 is allocated 2 nodes. At time period 624, job 2 642 completes and job 5 645 is added to the list of ongoing jobs; job 5 645 is allocated 1 node, and no other allocations are changed from their value at time period 623. At time period 625, job 1 completes, and job 5 645 up-scales by one node to an allocation of 2 nodes. At time period 628, job 6 646 is added to the list of ongoing jobs (i.e., after being received through the user interface 202); job 6 646 is allocated 1 node, and job 3 643 down-scales by one node to an allocation of 3 nodes. At time period 629, job 4 644 completes and job 6 646 up-scales by two nodes to an allocation of 3 nodes. At time period 630, job 3 643 completes and job 7 647 is added to the list of ongoing jobs, with an allocation of 3 nodes. At time period 632, job 5 645 completes and job 7 647 up-scales by two nodes to an allocation of 5 nodes. The left and right ends of the graph may be open-ended: the illustrated jobs may have begun execution prior to time period 621 and/or may continue after time period 633.

It will be appreciated that the graph of FIG. 6 and the allocation sequences of FIG. 5 are intended only as general illustrative examples, and may not be consistent with all allocation decision and computation operations described herein. It will also be appreciated that, as the allocation decision and computation operations described herein are based on estimates (e.g. estimates of time to completion for a given training job), some allocation decisions may change over time from earlier decisions based on updated projections or estimates.

The resource allocator 208 computes the node count values of the node count sequences of an allocation sequence using the various inputs described above. At each update interval, the resource allocator 208 receives from the ETC estimator 206 an ETC estimate indicating a remaining time to completion for each ongoing job. The remaining time to completion of a training job is referred to herein as the job's "training demand" or simply "demand" $d_i$. For each ongoing job $i \in I$ at time period $t \in T$, the resource allocator 208 allocates $$n_i^t$$

nodes to serve $$s_i^t$$

(called "served demand") out of job i's demand $d_i$. The amount of demand served for a given job, $$s_i^t,$$

during a given time period t indicates an amount of work performed to perform the training job, thereby reducing the amount of work remaining to complete the job, thereby reducing the job's remaining time to completion.

The resource allocator 208 then allocates resources (i.e. nodes 318) to each ongoing job with non-zero remaining time to completion, i.e. training demand $d_i>0$, within certain constraints. In some embodiments, each ongoing job must be allocated a minimum of one node 318 until the job completes. A given job, after being added to the list of ongoing jobs, must always be allocated a number of nodes 318 between the minimum node count value and the maximum node count value, inclusively, indicated by the training information of the job's job profile 210, i.e. within range $n_{i,min}$~$n_{i,max}$. 1 and 2. Finally, the number of nodes 318 allocated to the set of ongoing jobs must never exceed the total number of nodes 318, N, of the resource pool 316. Thus, equations (1) through (3) must always be satisfied:

$$n_i^t \geq n_{i,min} \forall\, i \in I, \forall\, t \in T \tag{1}$$

$$n_i^t \leq n_{i,max} \forall\, i \in I, \forall\, t \in T \tag{2}$$

$$\sum_i n_i^t \leq N \,\forall\, t \in T \tag{3}$$

In some embodiments, in order to maintain the precision of the training, the number of nodes $$n_i^t$$

allocated to a given training job are further constrained in that the number $$n_i^t$$

must be a power of 2, i.e.

$$n_i^t$$

must belong to k∈K={1, 2, 4, 8, 16, 32 . . . } as indicated below in equations (4)-(6). For example, if the user-specified range is 1-8 nodes for job i, only 1, 2, 4, or 8 nodes can be allocated to job i by the resource allocator 208 at any given time period t.

$$\frac{\left(1-\delta_{i,k}^{t,-}\right)}{M} - M \cdot \delta_{i,k}^{t,-} \le n_i^t - k \le M \cdot \left(1-\delta_{i,k}^{t,-}\right) \forall\, i \in I, \quad \forall\, t \in T, \forall\, k \in K \tag{4}$$

$$\frac{\left(1-\delta_{i,k}^{t,+}\right)}{M} - M \cdot \delta_{i,k}^{t,+} \le k - n_i^t \le M \cdot \left(1-\delta_{i,k}^{t,+}\right) \forall\, i \in I, \quad \forall\, t \in T, \forall\, k \in K \tag{5}$$

$$\sum\nolimits_k \delta_{i,k}^{t,-} + \sum\nolimits_k \delta_{i,k}^{t,+} = |K| + 1 \forall\, i \in I, \forall\, t \in T \tag{6}$$

In equations (4)-(6), $$\delta_{i,k}^{t,-} \text{ and } \delta_{i,k}^{t,+}$$

are binary indicators. M is a sufficiently-large number. The resource allocator 208 allocates k nodes to job i if $$\delta_{i,k}^{t,-} = \delta_{i,k}^{t,+} = 1.$$

For example, the resource allocator 208 allocates 4 nodes 318 to job 1 at time step 1 if $$\delta_{1,4}^{1,-} = \delta_{1,4}^{1,+} = 1.$$

The resource allocator 208 generates a set of allocation sequences based on the constraints described above. In some embodiments, the allocation sequences are generated one time period at a time: i.e., a node count is allocated to each ongoing job for the first time period, then another node count is allocated to each ongoing job for a second time period following the first time period, etc. Multiple sets of node counts may be generated for each time period, within the described constraints.

The ETC estimator 206 computes the estimated time to completion for each ongoing job at the end of a given time period based on the current training demand of the job and a number of nodes allocated to the ongoing job over each intervening time period between the current time period and the given time period. Thus, an ETC estimate computed at the beginning of time period 621 for job 1, intended to estimate the ETC estimate for job 1 at the end of time period

623, will be based on the current training demand of job 1 at the beginning of time 621 (e.g., 20% completed), and the number of nodes allocated to job 1 for each of time periods 621-623. If job 1 is allocated a large number of nodes in time periods 621-623, then the ETC estimate for job 1 at the end of time period 623 will be sooner than if job 1 is allocated a small number of nodes in time periods 621-623.

For each set of node counts for a given time period, a served demand $$s_i^t$$

is computed by the ETC estimator 206 for each ongoing job based on the assigned node count $$n_i^t$$

for job i at time period t, as shown in equations (7) and (8) below. In some configurations of the elastic training system 300, reduction in training time scales non-linearly with allocation of additional nodes 318: for example, training speed per node may decline by some amount, such as 20%, when the node count allocated to a training job doubles. A 20% reduction in training speed (i.e. served demand per node) is shown in equations (7) and (8) below. The computation of served demand is also constrained to ensure that the served demand $$s_i^t$$

does not overtake the total demand $d_i$, as indicated in equation (9) below wherein p is a time step parameter related to f, e.g., p=3/60=0.05 hours, if each time period (i.e. each update interval) is 5 minutes.

$$s_i^{t=1} \le p \cdot \sum\nolimits_k k \cdot 0.8^{log_2 k} \cdot \left(\delta_{i,k}^{t=1.-} + \delta_{i,k}^{t=1.+} - 1\right) \forall\, i \in I \tag{7}$$

$$s_i^t \le s_i^{t-1} + p \cdot \sum\nolimits_k k \cdot 0.8^{log_2 k} \cdot \left(\delta_{i,k}^{t,-} + \delta_{i,k}^{t,+} - 1\right) \forall\, i \in I, \forall\, t \in T, t \ge 2 \tag{8}$$

$$s_i^t \le d_i \forall\, i \in I, \forall\, t \in T \tag{9}$$

The resource allocator 208 computes an overall estimated progress value for each generated set of node counts. In some embodiments, the overall estimated progress value is a mean, over all ongoing jobs, of an estimated progress value of each ongoing job. In some embodiments, the estimated progress value for a given job is a proportion of the job that is completed after a given time period, i.e. a percentage or other proportion of the total training demand that has been served. The resource allocator 208 operated to maximize the overall estimated progress value over the look-ahead time horizon T, as indicated in equation (10) below.

$$\max \sum\nolimits_i \sum\nolimits_t \frac{s_i^t}{d_i} \tag{10}$$

In order to maximize the overall estimated progress value, the resource allocator 208 may use any of a number of optimization algorithms. In some embodiments, a branch-and-bound algorithm may be used to search for an optimal allocation sequence, i.e., allocating $$n_i = n_i^1$$

nodes for job i.

Figure 7:
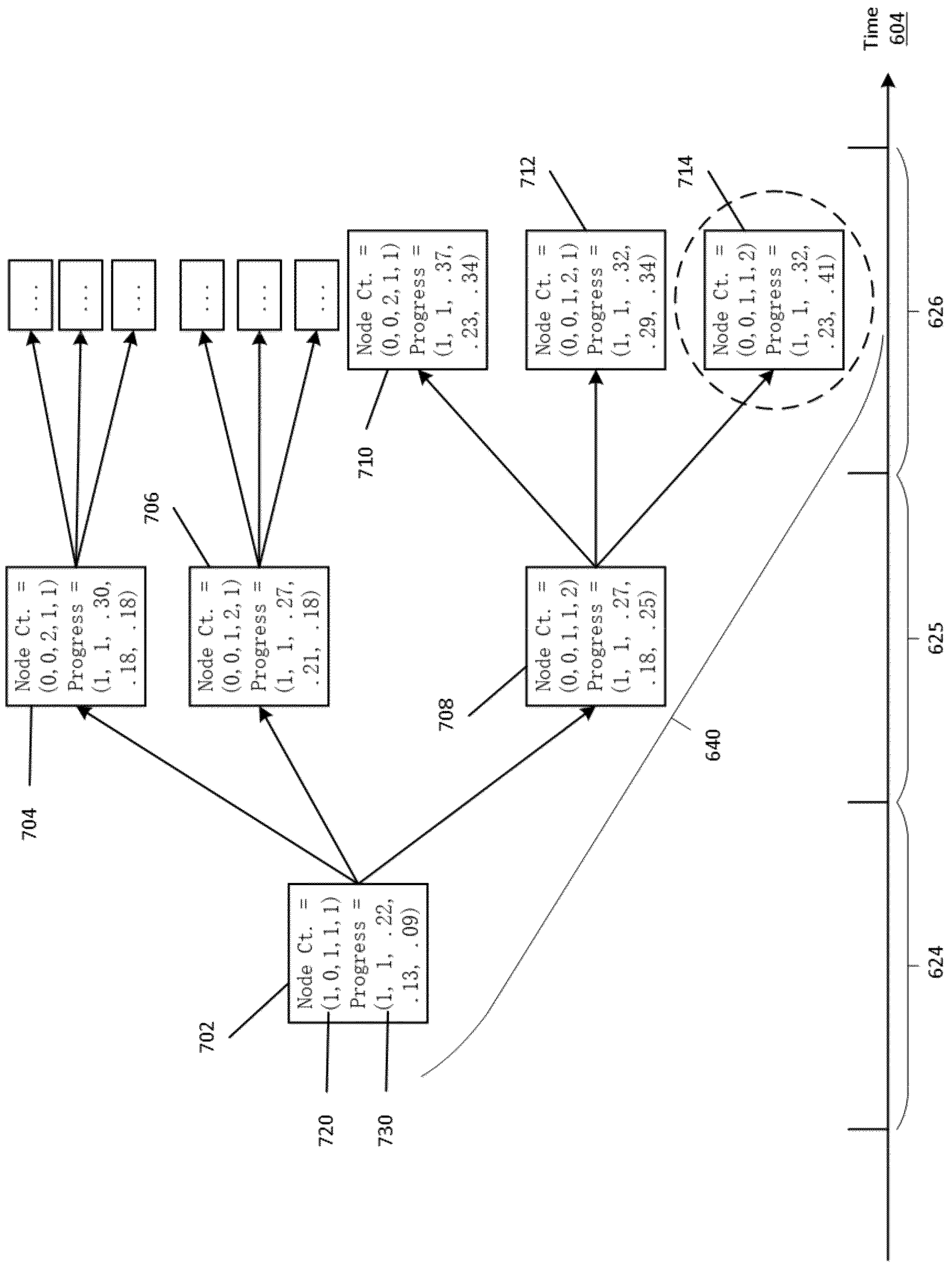
FIG. 7 is a search tree showing an optimal allocation sequence over three time periods generated by the resource allocator of the example elastic training module of FIG. 2.

FIG. 7 is a search tree showing an optimal allocation sequence over three time periods 624-626, as generated by the resource allocator 208 using a branch-and-bound algorithm. The root node 702 has three child nodes 704, 706, 708; child node 708 has three child nodes 710, 712, 714; and the other child nodes 704, 706 have their own child nodes (not shown for the sake of simplicity). (It will be appreciated that, as used with reference to FIG. 7, the word "node" may refer to a node in the search tree rather than a node of processor devices in the resource pool 316.) Each node corresponds to a set of node counts 720 for a set of ongoing jobs at a given time period: time period 624 for root node 702, time period 625 for child nodes 704, 706, 708, and time period 626 for child nodes 710, 712, 714. (FIG. 7 assumes a simplified resource pool 316 of four nodes 318 for the sake of simplicity.) Thus, for example, the root node 702 indicates a set of node counts 720 (1,0,1,1,1) allocated to five ongoing jobs at time period 624, i.e. jobs 1-5 shown in FIG. 6. Root node 702 also indicates a set of estimated progress values 730 for the five ongoing jobs: (1, 1, 0.22, 0.13, 0.09). The estimated progress values 730 indicate that, after time period 624, job 1 641 and job 2 642 will have completed (i.e. the estimated progress value of these jobs is 1, i.e. 100%), whereas job 3 643 will have served 22% of its demand, job 4 644 will have served 13% of its demand, and job 5 645 will have served 9% of its demand. These estimated progress values are based on the ETC estimates generated by the ETC estimator 206 based on the node count allocations 720 for the five jobs 641-645.

Each child node is generated based on the estimated progress values 730 of its parent node and a further set of ETC estimates generated by the ETC estimator 206 based on the node count allocations 720 of the child node. Thus, for example, child node 704, which allocates 2 nodes to job 3 643, increments its estimated progress value from 0.22 to 0.30 (i.e. a gain of 0.08), whereas child node 706, which allocates 1 node to job 3 643, increments its estimated progress value from 0.22 to 0.27 (i.e. a gain of 0.05).

In a branch-and-bound search, child nodes of a search tree (e.g. child nodes 704, 706, 708 of root node 702) are considered. A search metric (in this example, the overall estimated progress value of the node) is used to identify an optimal node of the child nodes. In this example, the optimal child node at time period 625 is child node 708, because its overall estimated progress value for all ongoing jobs is (0.27+0.18+0.25)/3=0.233, which is higher than that of child node 704 (0.220) or child node 706 (0.220).

After the optimal child node is identified, a bound is defined within which other child nodes may be considered in the next iteration of the search algorithm. In this example, the bound may be defined as plus or minus 0.005 estimated progress value. However, because 0.220<(0.233−0.005), neither child node 704 nor child node 706 falls within the bound, and neither has its own child nodes considered in the next iteration of the search algorithm. Instead, only the child nodes 710, 712, 714 are considered, and child node 714 is identified as the optimal child node using the same procedure as in the previous iteration.

Assuming a time horizon of three time periods (instead of five time periods as in FIG. 5-6), the estimated optimal allocation sequence 640 selected by the resource allocator 208 using its branch-and-bound search algorithm is the allocation sequence defined by nodes 702, 708, 714, i.e.:

| | Time period 624 | Time period 625 | Time period 626 |
|---|---|---|---|
| Job 1 | 1 node | 0 nodes | 0 nodes |
| Job 2 | 0 nodes | 0 nodes | 0 nodes |
| Job 3 | 1 node | 1 node | 1 node |
| Job 4 | 1 node | 1 node | 1 node |
| Job 5 | 1 node | 2 nodes | 2 nodes |

After an optimal allocation sequence is chosen using the branch-and-bound algorithm as shown in FIG. 7, the resource allocator 208 allocated the nodes to each ongoing training job as indicated for the first time period of the allocation sequence. The elastic training system 300 then uses the respective allocated number of nodes 318 to perform each training job over the first time period: for example, if job 1 641 is allocated 1 node during first time period 621 for the first allocation sequence 502, then a single node 318 of the resource pool 316 is used to perform job 1 641 during time period 621. The node 318 performs a set of operations for training the deep learning model specified in the training information of the job profile 210 for job 1 641, such as forward propagating the training dataset(s) specified in the training information through the model in batch sizes specified by the training information, back-propagating the objective function specified in the training information back through the model to adjust learnable parameters of the model, and continues doing so for a number of epochs specified in the training information until the job completes. At the end of time period 621, the amount of work performed to progress through job 1 641 (i.e. the demand served during time period 621) is determined by the ETC estimator 206 and used by the resource allocator 208 to determine a subsequent allocation sequence at the beginning of time period 622. This pattern continues for subsequent time periods, only changing when ongoing jobs complete or when jobs in the job queue 204 are added to the list of ongoing jobs.

The user interface 202 may be configured to generate and communicate to a user device 306 one or more further UI screens displaying job progress and/or job completion information to a user. The further UI screens may include various types of user output information. The user output information may include a total training time for the user's training job, which may also include an estimated remaining training time for the job, generated by the ETC estimator 206 while the job is ongoing, as described above. The user output information may also include an estimated training time savings based on the total training time and a fixed-allocation ETC for the training job, as described above. I.e., the estimated training time savings indicates how much time the user has saved by using the elastic training module 200 relative to the time the user's training job would have taken to complete using a fixed number of nodes as described above. The user output information may also include information indicating the resources allocated to the job over time, e.g. a graph of node count allocations to the user's job at each time period during which the job was ongoing. The user output information may also include estimated queue time indicating the estimated time until a job placed in the job queue 204 will be added to the list of ongoing jobs and begin being performed by one ore mode nodes 318.

Figure 8:
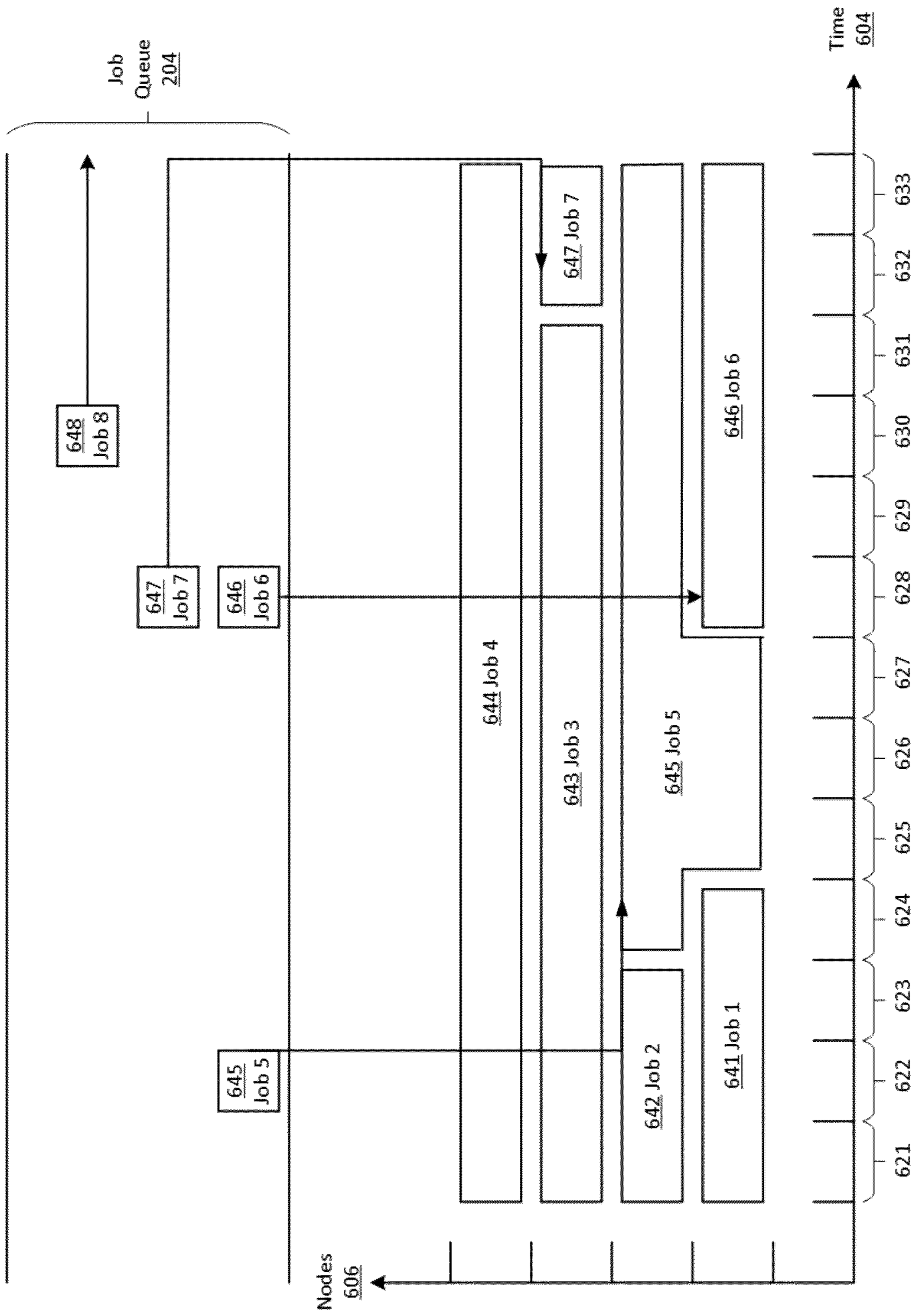
FIG. 8 is a graph showing a job queue and node counts allocated to training jobs over a plurality of time periods by the resource allocator of the example elastic training module of FIG. 2.

FIG. 8 is graph showing a job queue 204 and node counts allocated to training jobs over a plurality of time periods by the resource allocator 208. The simplified example shown in FIG. 8 is consistent with the optimal allocation sequence shown in FIG. 7: i.e. the resource pool 316 only has four nodes 318, and the node counts for each job shown for time periods 624-626 are consistent with those of FIG. 7.

In the example of FIG. 8, jobs 1-4 641-644 are the ongoing jobs at the beginning of time period 621, as in FIGS. 5-6. However, in this example the resource pool 316 only includes four nodes 318, resulting in only one node being allocated to each ongoing job 641-644. Thus, when job 5 645 is received at time period 622 in this example, the condition at operation 1006 is checked (i.e., are there more nodes than ongoing jobs?) and it is determined that no nodes are available for allocation to the new job 5 645. Thus, job 5 645 remains in the job queue 204 (or it is placed in the job queue 204 in some embodiments, as described above). At time period 624, job 2 652 completes, freeing up its allocated node and resulting in job 5 645 being removed from the job queue 204 and added to the list of ongoing jobs, with one node allocated to performing job 645. At time period 623, job 1 641 completes, freeing up another node, which is allocated to job 5 645, up-scaling job 5 645 from one node to two.

The decision to up-scale job 5 645 from one allocated node to two is performed by the resource allocator 208 as described above: an ETC estimate is generated for each ongoing job, estimated progress values are computed for each job, a search tree is generated including nodes indicating overall estimated progress values, and an optimal path through the search tree is identified using the branch-and-bound algorithm.

At time period 628, two new jobs are received (i.e., their training information is received through the user interface 202, and each has a job profile 210 created): job 6 646 and job 7 647. Job 6 646 is received first, and is therefore added to the job queue 204 before job 7 647. (In some embodiments, the order in which training information is received through the user interface 202 determines job queue 204 order for new jobs received within the same time period; in other embodiments, different ordering rules may be used to determine in what order new jobs are added to the job queue 204 if they are received within the same time period, such as ordering based on anticipated job training time or the user identifier.) Thus, job 6 646 is at a front position of the job queue 204, and job 7 647 is at a second position (which is the rear position) of the job queue 204.

The condition at operation 1006 is checked, and it is determined that there are more nodes 318 than ongoing jobs. Thus, job 6 646 is removed from the job queue 204 and allocated one node, which results in job 5 645 down-scaling from two nodes to one. The condition at operation 1006 is checked again, and it is determined that there are no free nodes, so job 7 647 remains in the job queue 204.

At time period 630, another new job, job 8 648, is received and added to the job queue 204. Job 8 648 is located behind job 7 647 in the job queue 648 because it was received later. At time period 632, job 3 643 completes, freeing up a node. The condition at operation 1006 is checked again, and it is determined that there are more nodes than ongoing jobs, resulting in job 7 647 (i.e. the job at the front position of the job queue 204) being removed from the job queue 204 and allocated a single node.

Example Elastic Training Method

The operations of the elastic training system 300 in elastically allocating nodes to training jobs will now be described with reference to the method flowcharts of FIGS. 9 and 11, also referring to FIG. 10 described above.

FIG. 9 is flowchart showing operations of an example method 900 for training a plurality of models using a cloud computing resource pool, in accordance with the example elastic training system 300 described above. It will be appreciated that the method 900 is provided solely as an example, and that whereas it describes operations performed by components of the example elastic training system 300, in some embodiments the operations may be performed by other devices or systems.

At 902, the elastic training module 200 obtains a plurality of job profiles 210, each job profile 210 comprising training information for performing a training job on one of the plurality of models. Operation 902 may include sub-operations 904 and, optionally, 906.

At 904, the resource allocator 208 and ETC estimator 206 identify the training jobs on the list of ongoing jobs, as described above.

At 906, the operations of FIG. 9 are performed one or more times to receive one or more new jobs from user devices 306 via the user interface 202.

After operations 904 and 906 are complete, the list of currently active jobs is known, divided between jobs in the job queue 204 and the list of ongoing jobs. A job profile 210 for each active job is accessible by the ETC estimator 206 and resource allocator 208 in the memory 314. The job profile 210 includes training information used to perform the training job, such as information defining the model, the training and/or validation dataset(s)

At 908, for each job profile, a plurality of allocation sequences is generated by processing the training information of the job profile 210 of the job with the resource allocator 208 and ETC estimator 206. In some embodiments, the plurality of allocation sequences are generated as a search tree as shown in FIG. 7, in which each path through the tree (from the root node to a node at a final time period of the time horizon) constitutes a candidate allocation sequence.

Operation 908 includes sub-operations 910, 912, and 914.

At 910, a list of ongoing jobs is determined for each time period in the time horizon. For example, if an ongoing job is expected to complete at a given time period within the time horizon of the allocation sequence, such that the number of ongoing jobs drops below the number of nodes 318 in the resource pool 316, then the resource allocator 208 may add a job from the front position of the job queue 206 to the list of ongoing jobs for the given time period of the allocation sequence.

Figure 11:
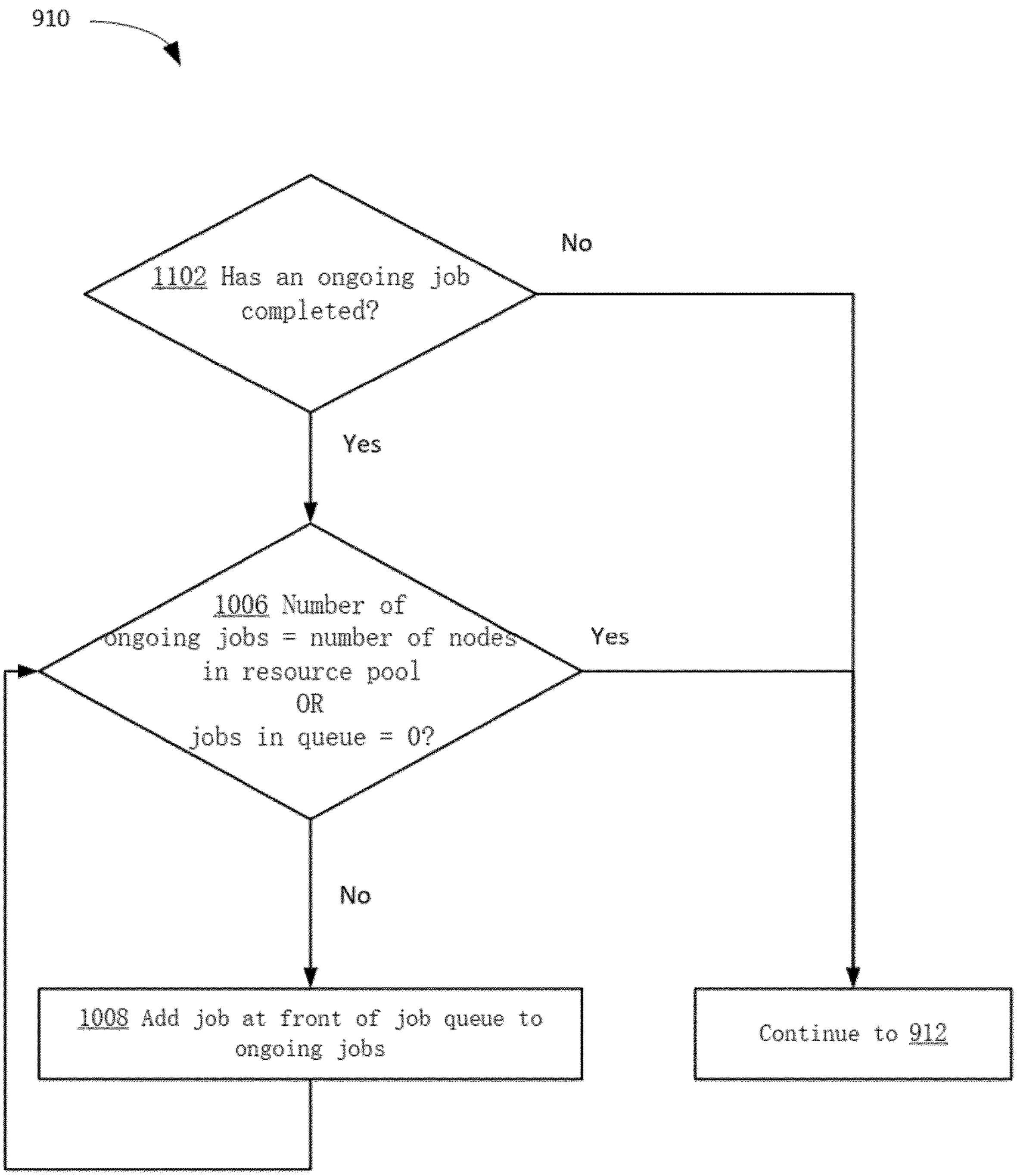
FIG. 11 is a flowchart showing sub-operations of the operation of determining the list of ongoing jobs of the method of FIG. 9.

FIG. 11 shows sub-sub-operations of the sub-operation 910 for determining the list of ongoing jobs. The sub-sub-operations of FIG. 11 are similar to the operations of FIG. 10, insofar as they require checking the condition of operation 1006 (i.e., whether the number of ongoing jobs is equal to the number of nodes in the resource pool, and whether there are jobs in the job queue 204), and adding queued jobs to the list of ongoing jobs at operation 1008 until the condition 1006 returns a positive result, at which point the method 900 continues to sub-operation 912.

FIG. 11 differs from FIG. 10, however, insofar as the initial, triggering sub-sub-operation 1102 checks whether an ongoing job has completed. This prompts the resource allocator 208 to determine whether there are one or more free nodes at the given time period of the allocation sequence which could be allocated to jobs waiting in the job queue 204. Thus, whereas the operations of FIG. 10 are triggered by a new job being received, the operations of FIG.

11 are triggered by the resource allocator 208 and ETC estimator 206 determining that an ongoing job is estimated to complete at a given time period within the time horizon.

At 912, for each of the ongoing jobs at each time period of the allocation sequence, the resource allocator 208 generates a plurality of candidate node counts, such that each ongoing job has a plurality of node count sequences across each time period of the time horizon as represented by the various paths through the search tree. Each node count sequence indicates, for each time period within the time horizon, a node count for the respective training job. The resource allocator 208 applies the various constraints on node counts for each job such that each node count sequence is resident within a series of nodes of the search tree in which the constraints are obeyed, e.g. the sum of the node count allocations 720 within a given node of the search tree is always less than or equal to the total number of nodes 318 in the resource pool 316.

In some examples, a respective maximum value $n_{i,max}$ and a respective minimum value $n_{i,min}$ of the node count for each training job is determined by processing the training information of the respective job profile 210. Each node count sequence for a training job is further constrained by being between the minimum value and maximum value, inclusively.

Ongoing jobs estimated to complete within the time horizon of the allocation sequence may be allocated a node count of zero for time periods after they complete, or they may be removed from the list of ongoing jobs such that they have no node count allocated to them for those time periods. New jobs estimated to be removed from the job queue 204 at a given time period within the time horizon of the allocation sequence may be allocated a node count beginning at the given time period, or may be regarded as having a node count of zero for each time period prior to the given time period. Thus, in both these cases (completed jobs and new jobs) the node count sequence may be regarded as having zero values for at least a portion of the time horizon of the allocation sequence, or may be regarded as having only a partial node count sequence for the allocation sequence.

At 914, the ETC estimator 206 generates a respective estimated progress value of the respective training job for each node count sequence at the end of the final time period of the allocation sequence. In some embodiments, the estimated progress value for each training job at the end of the final time period is computed based on incremental estimated progress values 730 for each node in the search tree path corresponding to the node count sequence.

At 916, the resource allocator 208 generates an estimated optimal allocation sequence 640 based on the estimated progress values 730 of the node count sequences. As described above, the estimated optimal allocation sequence 640 comprises a respective selected node count sequence for each training job over the time horizon. In some embodiments, this computation may be performed by the resource allocator by traversing the search tree using branch-and-bound with the overall estimated progress value being used as the search metric, and the estimated optimal allocation sequence 640 is the path through the search tree selected by the branch-and-bound algorithm. Thus, the resource allocator 208 processes the estimated progress values corresponding to each of the one or more node count sequences of each of the plurality of training jobs to generate the estimated optimal allocation sequence 640.

Operations 908 and 916 may be characterized as follows: a plurality of allocation sequences are generated at operation 908. Each allocation sequence includes a node count sequence for each of the plurality of ongoing training jobs. An overall estimated progress value is computed for each allocation sequence. The overall estimated progress value is based on the estimated progress value of each node count sequence of the allocation sequence. An estimated optimal allocation sequence is selected from the plurality of allocation sequences based on the overall estimated progress value of each allocation sequence. The overall estimated progress value of an allocation sequence is the mean of the estimated progress value of each node count sequence of the allocation sequence. The estimated progress value is an estimated proportion of the training job that will be complete at the end of the final time period of the time horizon.

At 918, each training job is performed over the first time period of the time horizon of the estimated optimal allocation sequence 640. A number of nodes 318 indicated by the node count of the respective selected node count sequence of the training job are used to perform the job for the first time period. The training job is performed by the allocated nodes 318 as described above: the nodes 318 are used to train the respective model using machine learning based on the training information for the respective model, i.e. the training information of the training job's job profile 210.

Method 900 is performed at each update interval. If one or more ongoing jobs have completed at least a portion of their training (i.e. a portion of their training demand has been served), then an actual progress value is determined for each training job as described above (i.e., the demand served as of the current time period). The actual progress value is used in the computation of further estimated progress values by the ETC estimator 206. The operations described above are repeated at the current time period, with the time horizon of the allocation sequence extending to a further time period after the final time period of the time horizon of the allocation sequence of the previous iteration of the method 900.

For embodiments in which the update interval is shorter than the duration of a time period, and the current update interval occurs before the end of the current time period, the actual progress value may be computed for each ongoing job and used to update the current allocation sequence (i.e. to generate a new allocation sequence over the same time periods as the allocation sequence generated by the previous iteration of the method 900). Nodes may be re-allocated and/or jobs may be added to the list of ongoing jobs based on the updated allocation sequence.

The operation of the job queue 204, as detailed in FIG. 8 and FIGS. 10-11, may be characterized as follows. At a first time period, one or more job profiles 210 have already been obtained by the elastic training module 200, and are being processed as ongoing jobs. A further job profile 210 is obtained at operation 1002. In response to determining that the number of ongoing training jobs is at least equal to the number of nodes 318 of the cloud computing resource pool 316 (at operation 1006), the further job profile 210 is added to the job queue 204 (at operation 1004, in this example taking place after operation 1006).

At a later time period (or update interval), in response to determining that the number of ongoing training jobs is less than the number of nodes 318 of the cloud computing resource pool 316 and that the further job profile 210 is at a front of the job queue 204, the further job profile is added to the list of ongoing jobs (at operation 1008) and operations 908 through 918 of method 900 are performed, with the new job being included in the list of ongoing jobs included in the allocation sequences.

General

Although the present disclosure describes functions performed by certain components and physical entities, it should be understood that, in a distributed system, some or all of the processes may be distributed among multiple components and entities, and multiple instances of the processes may be carried out over the distributed system.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. In general, the software improves the operation of the hardware in one or more ways.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for training a plurality of models using a cloud computing resource pool comprising a plurality of nodes, each node comprising a plurality of processor devices, comprising:

obtaining a plurality of job profiles, each job profile comprising training information for a training job, wherein a training job comprises training one of the plurality of models;

for each job profile, processing the respective training information to:

generate one or more node count sequences, each node count sequence indicating, for each of a first plurality of time periods beginning with a first time period and ending with a final time period, a node count for the respective training job; and for each node count sequence, generate a respective estimated progress value of the respective training job at the end of the final time period;

processing the estimated progress values corresponding to each of the one or more node count sequences of each of the plurality of training jobs to generate an estimated optimal allocation sequence comprising a respective selected node count sequence for each training job; and for each training job, over the first time period, using a number of the plurality of nodes indicated by the node count of the respective selected node count sequence for the first time period to train the respective model based on the training information for the respective model.

2. The method of claim 1, further comprising:

determining a respective maximum value and a respective minimum value of the node count for each training job;

wherein each node count sequence indicates, for each of a first plurality of time periods beginning with a first time period and ending with a final time period, a node count for the respective training job between and inclusive of the maximum value and the minimum value.

3. The method of claim 2, wherein, for each job profile, the minimum value, the maximum value, and the training information are determined based on user input obtained from a user device.

4. The method of claim 3, further comprising:

obtaining the training information for a first job profile of the plurality of job profiles based on a first user input obtained from the user device;

processing the training information to generate an estimated time to completion (ETC) for the training job of the first job profile;

generating user output information indicating the ETC for the training job;

sending the user output information to the user device; and obtaining the minimum value and the maximum value of the node count based on a second user input obtained from the user device.

5. The method of claim 4, wherein:

obtaining the maximum value based on the second user input comprises computing the maximum value as the lower of:

a node count cap value; and a user input node count maximum value indicated by the second user input.

6. The method of claim 4, wherein obtaining the minimum value and the maximum value based on the second user input comprises:

determining that the training job should use a fixed node count based on the second user input; and setting the maximum value and minimum value to a predetermined fixed node count value.

7. The method of claim 1, further comprising, after training the models over the first time period:

determining an actual progress value for each training job;

for each job profile, processing the respective training information and the respective actual progress value to:

generate one or more node count sequences, each node count sequence indicating, for each of a second plurality of time periods beginning with a new first time period and ending with a new final time period, a node count for the respective training job; and for each node count sequence, generate a respective estimated progress value of the respective training job at the end of the new final time period;

processing the estimated progress values corresponding to each of the one or more node count sequences of each of the plurality of training jobs to compute an estimated optimal allocation sequence comprising a respective selected node count sequence for each training job; and for each training job, over the new first time period, using a number of the plurality of nodes indicated by the node count of the respective selected node count sequence for the new first time period to train the respective model using machine learning based on the training information for the respective model.

8. The method of claim 1, wherein processing the estimated progress values to compute the estimated optimal resource allocation comprises:

generating a plurality of allocation sequences, each allocation sequence comprising a node count sequence for each of the plurality of training jobs;

for each allocation sequence, computing an overall estimated progress value based on the estimated progress value of each node count sequence of the allocation sequence; and selecting the estimated optimal allocation sequence from the plurality of allocation sequences based on the overall estimated progress value of each allocation sequence.

9. The method of claim 8, wherein the overall estimated progress value of an allocation sequence is the mean of the estimated progress value of each node count sequence of the allocation sequence.

10. The method of claim 1, wherein, for each training job, the estimated progress value is an estimated proportion of the training job that will be complete at the end of the final time period.

11. The method of claim 1, further comprising:

obtaining a further job profile;

in response to determining that the number of training jobs of the plurality of job profiles is at least equal to the number of nodes of the cloud computing resource pool, adding the further job profile to a job queue;

in response to determining that the number of training jobs of the plurality of job profiles is less than the number of nodes of the cloud computing resource pool and that the further job profile is at a front of the job queue, repeating the steps of:

processing the training data of each job profile, including the further job profile, to generate a respective estimated progress value of each respective training job at the end of a further plurality of time periods;

processing the estimated progress values to compute an estimated optimal allocation sequence; and training the models, including the model of the further job profile, over a further time period of the further plurality of time periods.

12. The method of claim 1, further comprising:

computing a fixed-allocation estimated time to completion (ETC) for a first training job of the plurality of training jobs premised on the allocation of a fixed number of nodes to the first training job;

in response to determining that the first training job has completed, generating user output information indicating:

a total training time for the first training job; and an estimated training time savings based on the total training time and the fixed-allocation ETC for the first training job; and sending the user output information to a user device.

13. The method of claim 12, wherein the user output information further includes training time allocation information indicating changes in the number of nodes allocated to the training job over the total training time.

14. A system comprising:

a cloud computing resource pool comprising a plurality of nodes;

a resource allocation processor device; and a memory storing instructions that, when executed by the resource allocation processor device, cause the resource allocation processing unit to train a plurality of models by:

obtaining a plurality of job profiles, each job profile comprising training information for a training job, wherein a training job comprises training one of the plurality of models;

for each job profile, processing the respective training information to:

generate one or more node count sequences, each node count sequence indicating, for each of a first plurality of time periods beginning with a first time period and ending with a final time period, a node count for the respective training job; and for each node count sequence, generate a respective estimated progress value of the respective training job at the end of the final time period;

processing the estimated progress values corresponding to each of the one or more node count sequences of each of the plurality of training jobs to generate an estimated optimal allocation sequence comprising a respective selected node count sequence for each training job; and for each training job, over the first time period, using a number of the plurality of nodes indicated by the node count of the respective selected node count sequence for the first time period to train the respective model based on the training information for the respective model.

15. The system of claim 14, wherein:

training the plurality of models further comprises:

obtaining the training information for a first job profile of the plurality of job profiles based on a first user input obtained from the user device;

processing the training information to generate an estimated time to completion (ETC) for the training job of the first job profile;

generating user output information indicating the ETC for the training job;

sending the user output information to the user device; and obtaining a minimum value and a maximum value of a node count for the first job profile based on a second user input obtained from the user device;

each node count sequence indicates, for each of a first plurality of time periods beginning with a first time period and ending with a final time period, a node count for the respective training job between and inclusive of the maximum value and the minimum value; and obtaining the maximum value based on the second user input comprises computing the maximum value as the lower of:

a node count cap value; and a user input node count maximum value indicated by the second user input.

16. The system of claim 14, wherein:

processing the estimated progress values to compute the estimated optimal resource allocation comprises:

generating a plurality of allocation sequences, each allocation sequence comprising a node count sequence for each of the plurality of training jobs;

for each allocation sequence, computing an overall estimated progress value based on the estimated progress value of each node count sequence of the allocation sequence; and selecting the estimated optimal allocation sequence from the plurality of allocation sequences based on the overall estimated progress value of each allocation sequence; and the overall estimated progress value of an allocation sequence is the mean of the estimated progress value of each node count sequence of the allocation sequence.

17. The system of claim 16, wherein, for each training job, the estimated progress value is an estimated proportion of the training job that will be complete at the end of the final time period.

18. The system of claim 14, wherein training the plurality of models further comprises:

obtaining a further job profile;

in response to determining that the number of training jobs of the plurality of job profiles is at least equal to the number of nodes of the cloud computing resource pool, adding the further job profile to a job queue;

in response to determining that the number of training jobs of the plurality of job profiles is less than the number of nodes of the cloud computing resource pool and that the further job profile is at a front of the job queue, repeating the steps of:

processing the training data of each job profile, including the further job profile, to generate a respective estimated progress value of each respective training job at the end of a further plurality of time periods;

processing the estimated progress values to compute an estimated optimal allocation sequence; and training the models, including the model of the further job profile, over a further time period of the further plurality of time periods.

19. The system of claim 14, wherein:

training the plurality of models further comprises:

computing a fixed-allocation estimated time to completion (ETC) for a first training job of the plurality of training jobs premised on the allocation of a fixed number of nodes to the first training job;

in response to determining that the first training job has completed, generating user output information indicating:

a total training time for the first training job; and an estimated training time savings based on the total training time and the fixed-allocation ETC for the first training job; and sending the user output information to a user device; and the user output information further includes training time allocation information indicating changes in the number of nodes allocated to the training job over the total training time.

20. A non-transitory computer-readable medium storing instructions thereon to be executed by at least one processor in a cloud computing system, the instructions, when executed, causing the cloud computing system to perform a method comprising:

obtaining a plurality of job profiles, each job profile comprising training information for a training job, wherein a training job comprises training one of the plurality of models;

for each job profile, processing the respective training information to:

generate one or more node count sequences, each node count sequence indicating, for each of a first plurality of time periods beginning with a first time period and ending with a final time period, a node count for the respective training job; and for each node count sequence, generate a respective estimated progress value of the respective training job at the end of the final time period;

processing the estimated progress values corresponding to each of the one or more node count sequences of each of the plurality of training jobs to generate an estimated optimal allocation sequence comprising a respective selected node count sequence for each training job; and for each training job, over the first time period, using a number of the plurality of nodes indicated by the node count of the respective selected node count sequence for the first time period to train the respective model based on the training information for the respective model.

* * * * *